United States Patent
Nobori

(10) Patent No.: US 9,557,893 B2
(45) Date of Patent: Jan. 31, 2017

(54) IMAGE TRANSMISSION DEVICE, DISPLAY SYSTEM, IMAGE TRANSMISSION PROGRAM, AND RECORDING MEDIUM

(75) Inventor: Tatsuhiko Nobori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1392 days.

(21) Appl. No.: 12/424,683

(22) Filed: Apr. 16, 2009

(65) Prior Publication Data
US 2009/0265660 A1    Oct. 22, 2009

(30) Foreign Application Priority Data
Apr. 17, 2008 (JP) ................ 2008-108275

(51) Int. Cl.
| | | |
|---|---|---|
| G06F 3/048 | (2013.01) | |
| G06F 3/0483 | (2013.01) | |
| G06F 3/14 | (2006.01) | |
| G06F 9/44 | (2006.01) | |
| H04N 21/41 | (2011.01) | |
| H04N 21/4143 | (2011.01) | |
| H04N 21/4728 | (2011.01) | |
| H04N 21/485 | (2011.01) | |
| G09G 5/14 | (2006.01) | |

(52) U.S. Cl.
CPC ........... *G06F 3/0483* (2013.01); *G06F 3/1462* (2013.01); *G06F 8/38* (2013.01); *H04N 21/4122* (2013.01); *H04N 21/4143* (2013.01); *H04N 21/4728* (2013.01); *H04N 21/4858* (2013.01); *G09G 5/14* (2013.01)

(58) Field of Classification Search
CPC ......... G09G 3/002; G06T 5/50; H04B 5/0031; H04N 2201/0081
USPC . 715/788, 748, 769; 399/297, 130; 345/581, 204
See application file for complete search history.

(56) References Cited

U.S. PATENT DOCUMENTS

| | | | | |
|---|---|---|---|---|
| 6,208,429 | B1 * | 3/2001 | Anderson | 358/1.18 |
| 6,320,667 | B1 * | 11/2001 | Mitsuhashi | 358/1.1 |
| 6,625,309 | B1 * | 9/2003 | Li et al. | 382/173 |
| 7,027,169 | B1 * | 4/2006 | Morikawa et al. | 358/1.14 |
| 7,050,097 | B2 * | 5/2006 | Schick et al. | 348/239 |
| 7,212,229 | B2 * | 5/2007 | Parulski et al. | 348/207.2 |
| 7,215,345 | B1 * | 5/2007 | Hanko | 345/620 |
| 7,248,632 | B1 * | 7/2007 | McKenzie et al. | 375/240.2 |
| 7,509,570 | B2 * | 3/2009 | Narusawa | 715/211 |
| 7,536,650 | B1 * | 5/2009 | Robertson et al. | 715/767 |

(Continued)

FOREIGN PATENT DOCUMENTS

| | | |
|---|---|---|
| JP | 04-306094 A | 10/1992 |
| JP | 2004-069996 | 3/2004 |

(Continued)

OTHER PUBLICATIONS

Derwent 1998203960, Feb. 1998, Kokusai, Japan, H04N 7/32.*

*Primary Examiner* — Matthew Ell
(74) *Attorney, Agent, or Firm* — ALG Intellectual Property, LLC

(57) ABSTRACT

An image transmission device which transmits image data of a display image to be displayed by a display device includes: a selecting unit which selects an object constituting the display image; a data generating unit which generates transmission data to serve as the image data of the display image on the basis of image data of the selected object; and a data transmitting unit which transmits the generated transmission data to the display device.

19 Claims, 19 Drawing Sheets

(56) References Cited

U.S. PATENT DOCUMENTS

| | | |
|---|---|---|
| 7,573,486 B2* | 8/2009 | Mondry et al. ............... 345/619 |
| 7,613,466 B2* | 11/2009 | Unkefer et al. ........... 455/452.2 |
| 7,707,203 B2* | 4/2010 | Hyder et al. ................. 707/710 |
| 2002/0054158 A1* | 5/2002 | Asami .......................... 345/838 |
| 2002/0122158 A1 | 9/2002 | Miyashita et al. ............. 353/30 |
| 2003/0093759 A1* | 5/2003 | Narusawa .................... 715/517 |
| 2004/0008212 A1* | 1/2004 | O'Neill ........................ 345/628 |
| 2004/0085343 A1* | 5/2004 | Jackson et al. ............... 345/726 |
| 2004/0240835 A1* | 12/2004 | Kuroda ........................ 385/147 |
| 2005/0123083 A1* | 6/2005 | Kawakami .................... 375/347 |
| 2005/0232656 A1* | 10/2005 | Asai et al. ................... 399/130 |
| 2006/0109502 A1* | 5/2006 | Nakajima et al. ........... 358/1.15 |
| 2006/0229899 A1* | 10/2006 | Hyder et al. ...................... 705/1 |
| 2007/0002356 A1* | 1/2007 | Ha .............................. 358/1.13 |
| 2007/0106950 A1* | 5/2007 | Hutchinson et al. ......... 715/761 |
| 2007/0188482 A1 | 8/2007 | Fujimori |
| 2007/0216950 A1* | 9/2007 | Yamakado et al. .......... 358/1.18 |
| 2007/0257927 A1 | 11/2007 | Sakanishi et al. |
| 2008/0013916 A1* | 1/2008 | Sharpe et al. .................. 386/52 |
| 2008/0036789 A1* | 2/2008 | de Leon ....................... 345/625 |
| 2008/0040387 A1* | 2/2008 | Schwartz et al. .......... 707/104.1 |
| 2008/0279480 A1* | 11/2008 | Inamoto et al. .............. 382/305 |
| 2009/0096939 A1* | 4/2009 | Nomizo ........................ 348/744 |
| 2009/0279793 A1* | 11/2009 | Misawa ........................ 382/224 |
| 2011/0066971 A1* | 3/2011 | Forutanpour et al. ........ 715/788 |
| 2012/0120320 A1* | 5/2012 | Chowdhry et al. ........... 348/586 |

FOREIGN PATENT DOCUMENTS

| | | |
|---|---|---|
| JP | 2004-086277 | 3/2004 |
| JP | 2005-107015 | 4/2005 |
| JP | 2006-054725 | 2/2006 |
| JP | 2007-212920 | 8/2007 |
| JP | 2007-218944 A | 8/2007 |
| JP | 2008-185620 | 8/2008 |

* cited by examiner

DIFFERENTIAL AREA

PACKET GENERATING AREA

DIFFERENTIAL AREA

PACKET GENERATING AREA

IMAGE TRANSMISSION DEVICE, DISPLAY SYSTEM, IMAGE TRANSMISSION PROGRAM, AND RECORDING MEDIUM

The entire disclosure of Japanese Patent No. 2008-108275 filed Apr. 17, 2008 is expressly incorporated by reference herein.

BACKGROUND

1. Technical Field

The present invention relates to an image transmission device which transmits image data to a display device, a display system including the image transmission device and the display device, an image transmission program executed in the image transmission device, and a recording medium in which the image transmission program is recorded.

2. Related Art

Traditionally, a display system including an image transmission device which transmits image data and an image display device which displays an image corresponding to the image data is known. As such a display system, a projector system is known in which a PC (Personal Computer) as an image transmission device and a projector as an image display device are connected to each other via a USB (Universal Serial Bus) cable, for example, as disclosed in JP-A-2004-69996.

In the projector system disclosed in JP-A-2004-69996, image data generated by the PC is transmitted to the projector via the USB cable. The projector forms and displays an image corresponding to the acquired image data, on the projection surface of a screen or the like. Since a single such projector can display a relatively large image, a projector system using this projector is often used for presentations at companies, home theater and so on.

However, in the projector system disclosed in JP-A-2004-69996, image data transmitted from the PC to the projector is related to a screen that is operating on the PC. That is, the image data may include image data related to the desktop of the OS (Operating System) as well as image data related to a screen that is being executed, of a predetermined application executed by the PC. Therefore, there is a problem that image data including an image which the user of the PC does not want other people to see, such as an image set as wallpaper of the desktop or an image of a note pad that is started for preparation of minutes, is transmitted to the projector and the image is displayed by the projector. Thus, it is desired to provide a configuration in which an image to be displayed by the projector can be set on the image transmission device side such as PC.

SUMMARY

An advantage of some aspects of the invention is that an image transmission device, a display system, an image transmission program and a recording medium which enable setting of the configuration of a display image are provided.

According to an aspect of the invention, an image transmission device transmits image data of a display image to be displayed by a display device. The image transmission device includes a selecting unit which selects an object constituting the display image, a data generating unit which generates transmission data to serve as the image data of the display image on the basis of image data of the selected object, and a data transmitting unit which transmits the generated transmission data to the display device.

Here, for example, if the image transmission device is formed by a PC, "object" is a general term for still images and movies stored in a storage unit such as an HDD (Hard Disk Drive) provided in the PC, applications that are being executed, character strings and graphics.

The display device refers to a display device connected to the image transmission device. A projector as described above can be employed as an example.

According to this aspect, image data of a display image is generated on the basis of image data of an object selected by the selecting unit, and the image data is transmitted to the display device. That is, the image data of the display image transmitted to the display device is based on the image data of the object selected by the selecting unit. According to this, the user of the image transmission device can set the configuration of the display image. Thus, unwanted image data, for example, image data of an image which the user of the image transmission device does not want to show other people, can be prevented from being transmitted to and displayed by the display device.

It is preferable that the image transmission device includes a layout setting unit which sets a layout in the display image, of the image of the object selected by the selecting unit, and that the data generating unit generates the transmission data based on the layout set by the layout setting unit.

According to this, the layout (for example, display position and size or so on) of the image of the object in the display image can be set. Therefore, the image of the object can be displayed at a desired position in the display image and with a desired size. Moreover, if plural objects are selected, the images of these objects can be arranged and displayed to partly overlap each other. Thus, the degree of freedom in the setting of the display image displayed by the display device can be improved.

It is also preferable that the image transmission device includes a display size acquiring unit which acquires a displayable size of an image that can be displayed by the display device, a layout area forming unit which forms a layout area corresponding to the acquired displayable size, and an image arrangement unit which arranges an image corresponding to the object selected by the selecting unit, in the layout area, and that the layout setting unit sets the layout of the object corresponding to the image in accordance with the image set in the layout area.

According to this, by setting the layout of an image corresponding to the layout area formed by the layout area forming unit in accordance with the displayable size of the display device, it is possible to set the layout of the image of the object in the display image. Thus, the setting state of the display image can be visually understood and therefore the setting of the display image can be easily carried out.

It is also preferable that the image transmission device includes a hierarchical level setting unit which sets a hierarchical level indicating a position from a backmost side of the object, and that the data generating unit generates the transmission data in order from the object for which the hierarchical level set by the hierarchical level setting unit is low.

Here, in the case where objects are arranged to partly overlap each other, one object is arranged on the back side and the other object is arranged on the front side. In such a case, if the image of the object on the front side is updated first and the image of the object on the back side is updated later, the front-back relation of the images of the objects in the display image collapses.

However, according to this aspect of the invention, the transmission data is generated in order from the object having a low hierarchical level, that is, the object on the back side. Thus, the image of the object on the back side is updated first and the image of the object on the front side is updated later. In the display image, the image of the object on the back side can be situated on the back side and the image of the object on the front side can be situated on the front side. Therefore, the display image based on the set layout can be securely displayed.

It is also preferable that the data generating unit generates the transmission data including the image data of the object for each of the objects.

According to this, in the case where objects are arranged without overlapping each other, setting can be made so that image data of still images or the like which do not need image update are not transmitted to the display device whereas image data of movies or the like that need image update are sequentially transmitted to the display device. Thus, the amount of data transmitted to the display device can be reduced.

Alternatively, it is preferable that the data generating unit generates image data for one screen of the display image and generates the transmission data based on the image data for one screen.

Here, in the case where objects are arranged to overlap each other, if transmission data including the image data of the object for each object is transmitted, the image of the object on the back side is displayed first in the display image and then the image of the object on the front side is displayed. Therefore, there is timing when a display image in which objects have an inappropriate front-back relation is displayed.

However, according to this aspect of the invention, after image data for one screen is generated, transmission data is generated on the basis of the image data for one screen generated in advance. Therefore, such inconvenience can be prevented. Thus, a display image according to the set layout can be properly displayed.

It is also preferable that the data generating unit includes: a change determining unit which determines whether the image data for one screen that is newly generated is changed from the image data for one screen that is generated before the newly generated image data; a difference acquiring unit which acquires differential image data as a difference from the image data for one screen that is generated before, from the newly generated image data for one screen if it is determined by the change determining unit that there is a change; and a transmission data generating unit which generates the transmission data based on the differential image data.

According to this aspect of the invention, the transmission data transmitted to the display device includes differential image data as a difference between newly generated image data for one screen and image data for one screen that is generated before the newly generated image data. Thus, since sequential transmission of the image data for one screen to the display device is eliminated, the amount of data transmitted to the display device can be reduced.

It is also preferable that if an image formed by the differential image data is not rectangular, the transmission data generating unit divides the differential image data to generate plural rectangular image data so that an image to be formed is rectangular, and generates each of the transmission data based on each of the rectangular image data.

According to this aspect of the invention, each of transmission data transmitted to the display device includes rectangular image data forming a rectangular image. Therefore, when generating a display image at the display device, the rectangular image data as update image data can be easily coupled with image data of a display image that is currently displayed. Thus, the burden of image display processing in the display device can be reduced and the display image can be properly displayed.

Alternatively, it is preferable that if an image formed by the differential image data is not rectangular, the transmission data generating unit adds an area that is not displayed by the display device, thus generates rectangular image data so that an image to be formed is rectangular, and generates the transmission data based on the rectangular image data.

Here, if an image of the differential image data is not rectangular, and the image is divided into plural rectangular images and each of transmission data including image data of the divided rectangular images is generated, the burden of transmission data generation processing increases as the number of divisions becomes large. Also, since header information indicating the position of the image in the display device is included in each transmission data, the amount of data transmitted to the display device may increase.

However, according to this aspect of the invention, an area that is not displayed by the display device is added to an image serving as a difference, and transmission data is generated on the basis of rectangular image data generated so that an image to be formed is rectangular. Therefore, it suffices to generate one transmission data to one change area, and the amount of data transmitted to the display device can be reduced. Moreover, as the display device updates a display image so as not to display such an additional area, the display image can be properly displayed.

According to another aspect of the invention, a display system includes the image transmission device, and a display device which displays a display image based on image data transmitted from the image transmission device.

According to this aspect of the invention, the same effects as those of the above image transmission device can be realized. This enables improvement in versatility of the display system.

According to still another aspect of the invention, an image transmission program is executed by an image transmission device which transmits image data of a display image to be displayed by a display device. The program includes: selecting an object to be included in the display image; generating transmission data as image data of the display image on the basis of image data of the selected object; and transmitting the generated transmission data to the display device.

According to this aspect of the invention, as the image transmission device executes the image transmission program, the same effects as those of the image transmission device can be realized.

According to still another aspect of the invention, a recording medium has the image transmission program recorded therein in a computer-readable manner.

According to this aspect of the invention, as an image transmission device reads and executes the image transmission program recorded in the recording medium in a computer-readable manner, the same effects as those of the image transmission device can be realized. That is, it is possible to set a display image to be displayed by the display device. Moreover, as the recording medium, magnetic tapes such as DAT (Digital Audio Tape), magnetic disks such as FD (Flexible Disc), optical discs such as CD (Compact Disc) and DVD (Digital Versatile Disc), magneto-optical discs, hard disk devices, semiconductor memories and soon can be used. By using these, it is possible to install and execute the image transmission program in the image transmission device and also to easily distribute the image transmission program.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.
Configuration of Display System
FIG. 1 is a block diagram showing the configuration of a display system 1 according to this embodiment.

Figure 1:
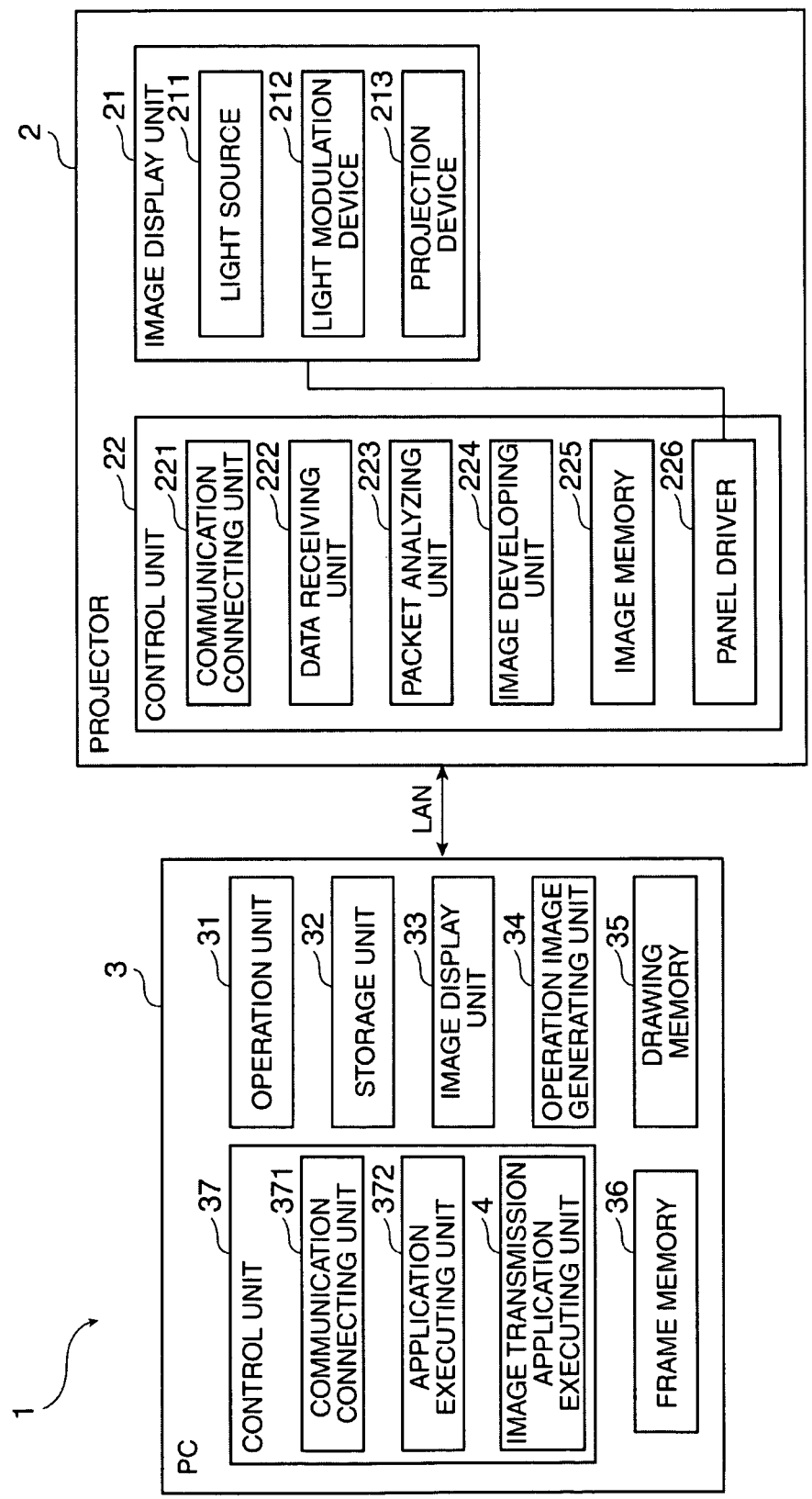
FIG. 1 is a block diagram showing the configuration of a display system according to a first embodiment of the invention.

The display system 1 of this embodiment includes a projector 2 as a display device, and a laptop personal computer (hereinafter simply referred to as "PC") 3 as an image transmission device which transmits image data of a display image to be displayed by an external device such as the projector 2, as shown in FIG. 1. In this embodiment, the projector 2 and the PC 3 are connected with each other via a LAN (Local Area Network). However, the projector 2 and the PC 3 may also be connected via a USB (Universal Serial Bus) or the like.
Configuration of Projector The projector 2 displays a display image corresponding to image data included in a packet received from the PC 3. Specifically, the projector 2 modulates a luminous flux exiting from a light source, thus forms image light corresponding to the image data, and projects the image light in an enlarged manner onto a projection surface such as a screen, thereby displaying a display image on the projection surface. The projector 2 has an image display unit 21 and a control unit 22.

The image display unit 21 is driven in accordance with a driving signal inputted from the control unit 22 and forms and projects the image light. The image display unit 21 includes a light source 211, a light modulation device 212 which modulates light exiting from the light source 211 and thus forms image light, and a projection device 213 which projects the image light.

Of these, the light modulation device 212 includes a liquid crystal panel having liquid crystal as an electro-optical material sealed between a pair of transparent glass substrates. The liquid crystal panel has the orientation of its liquid crystal controlled in accordance with a driving signal inputted from the control unit 22 and modulates the direction of polarization of the incident luminous flux.

The control unit 22 is configured as a circuit board with a CPU (Central Processing Unit) and the like mounted thereon, and controls driving of the entire projector 2. For example, the control unit 22 processes a packet received from the PC 3 and outputs a driving signal to the image display unit 21 so as to form a display image corresponding to the packet. The control unit 22 includes a communication connecting unit 221, a data receiving unit 222, a packet analyzing unit 223, an image developing unit 224, an image memory 225 and a panel driver 226.

The communication connecting unit 221 establishes communication connection to a connected external device (for example, the PC 3). In this case, the communication connecting unit 221 transmits the size of an image that can be formed by the light modulation device 212 (resolution and display size of the image) to the external device in response to a request from the connected external device.

The data receiving unit 222 acquires a packet inputted from the PC 3.

The packet analyzing unit 223 processes the acquired packet and acquires header information and image data from the packet.

The image developing unit 224 develops the acquired image data in the image memory 225 formed by a VRAM (Video Random Access Memory). In this case, the image developing unit 224 couples the acquired image data to the image data developed in the image memory 225 on the basis of position information and size information of the image data included in the acquired header information, and thus generates image data for one screen.

The panel driver 226 outputs a driving signal to the light modulation device 212 on the basis of the image data developed in the image memory 225 and causes the light modulation device 212 to form an image corresponding to the image data.

Configuration of PC

The PC 3 includes a general PC. The PC 3 reads out a program or the like stored in a storage unit 32 such as HDD (Hard Disk Drive) in accordance with a user's input operation to an operation unit 31 including a mouse and keyboard, and executes predetermined processing (for example, an application program). The PC 3 also reads out an image transmission program stored in the storage unit 32 in accordance with the input operation, executes an image transmission application, and generates and transmits image data (packet) of a display image to be displayed by the external device (for example, the projector 2). The PC 3 includes an image display unit 33, an operation image generating unit 34, a drawing memory 35, a frame memory 36 and a control unit 37, in addition to the operation unit 31 and the storage unit 32.

Of these, the drawing memory 35 includes a video memory and is used for generation of image data by the operation image generating unit 34.

The frame memory 36 is used when the image transmission application is executed by an image transmission application executing unit 4, which will be described later, of the control unit 37. For example, the frame memory 36 is used to copy various image data for one frame formed on the drawing memory 35.

The image display unit 33 includes a liquid crystal panel integrally attached to the PC 3 and displays an image corresponding to a driving signal inputted from the operation image generating unit 34. Such an image is an operation image showing the operation state of the PC 3 and includes an image of a screen at the time of execution when the image transmission application is started. In this embodiment, since the PC 3 is a laptop PC, the image display unit 33 is integrally attached to the PC 3. However, the image display unit 33 may include a display connected to the PC 3 via a cable or the like.

The operation image generating unit 34 includes a graphics chip. The operation image generating unit 34 forms an operation image of the PC 3 and various image data of an image at the time of executing an application that is being executed by the control unit 37, on the drawing memory 35 under the control of the control unit 37. The operation image generating unit 34 outputs a driving signal corresponding to image data of the operation image formed on the drawing memory 35 to the image display unit 33 and thus causes the image display unit 33 to display the operation image.

Figure 2:
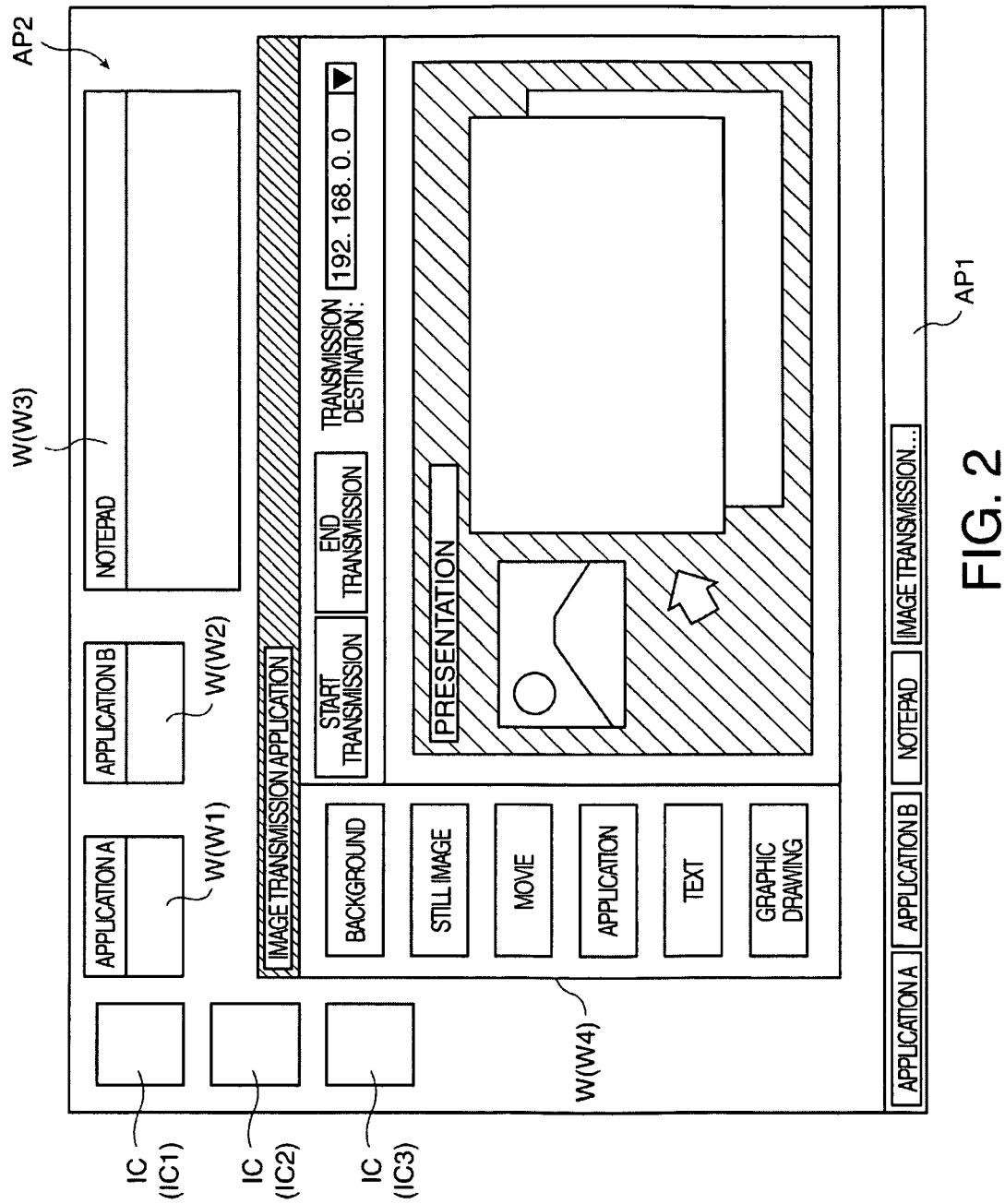
FIG. 2 shows an exemplary operation image in the embodiment.

FIG. 2 shows an exemplary operation image. Specifically, FIG. 2 shows an exemplary operation image where plural applications including the image transmission application are executed.

For example, if plural applications (application A, application B, notepad, and image transmission application) are being executed by the control unit 37, the operation image generating unit 34 generates image data of an operation image AP as shown in FIG. 2. This operation image AP includes an executed application display area AP1 showing the type of applications that are being executed, and a work area AP 2 showing the window of each application.

In the work area AP2, of these areas, if the window of the applications that are being executed is not in a state of being displayed in a full-screen (a state where the entire work area AP2 is covered by one window), windows W (W1 to W4) of the applications that are being executed and icons IC (IC1 to IC3) of filed arranged on the work area AP2 are displayed, as shown in FIG. 2. In this work area AP2, the arrangement position and size of the windows W1 to W4 can be adjusted by a predetermined operation (for example, dragging by the mouse). Therefore, though the windows W and icons IC are displayed without overlapping each other in FIG. 2, these windows and icons may overlap each other. In FIG. 2, of the currently executed applications (application A, application B, notepad, and image transmission application), the window of the image transmission application is active (operable).

Referring again to FIG. 1, the control unit 37 includes a CPU (Central Processing Unit) or the like, and starts the OS (Operating System) to control the entire PC 3. The control unit 37 includes a communication connecting unit 371, an application executing unit 372 and the image transmission application executing unit 4.

The communication connecting unit 371 establishes communication connection with an external device (for example, the projector 2) connected to the PC 3. Specifically, the communication connecting unit 371 establishes communication connection with an external device corresponding to an IP (Internet Protocol) address, channel and so on designated by the user, and an external device directly connected to the PC 3 via a USB (Universal Serial Bus) cable.

The application executing unit 372 reads out a program stored in the storage unit 32 in accordance with the user's input operation to the operation unit 31, and executes an application corresponding to the program (for example, the above application A, application B or notepad, an application program that is not the image transmission application).

The image transmission application executing unit 4 reads out the image transmission program stored in the storage unit 32 and executes the image transmission application. Specifically, the image transmission application executing unit 4 generates image data corresponding to the user's input operation to the screen at the time of execution of the image transmission application displayed in the window W4 (FIG. 2 and FIG. 3) on the work area AP2, and transmits a packet (transmission data) generated on the basis of the image data to the projector 2.

Figure 3:
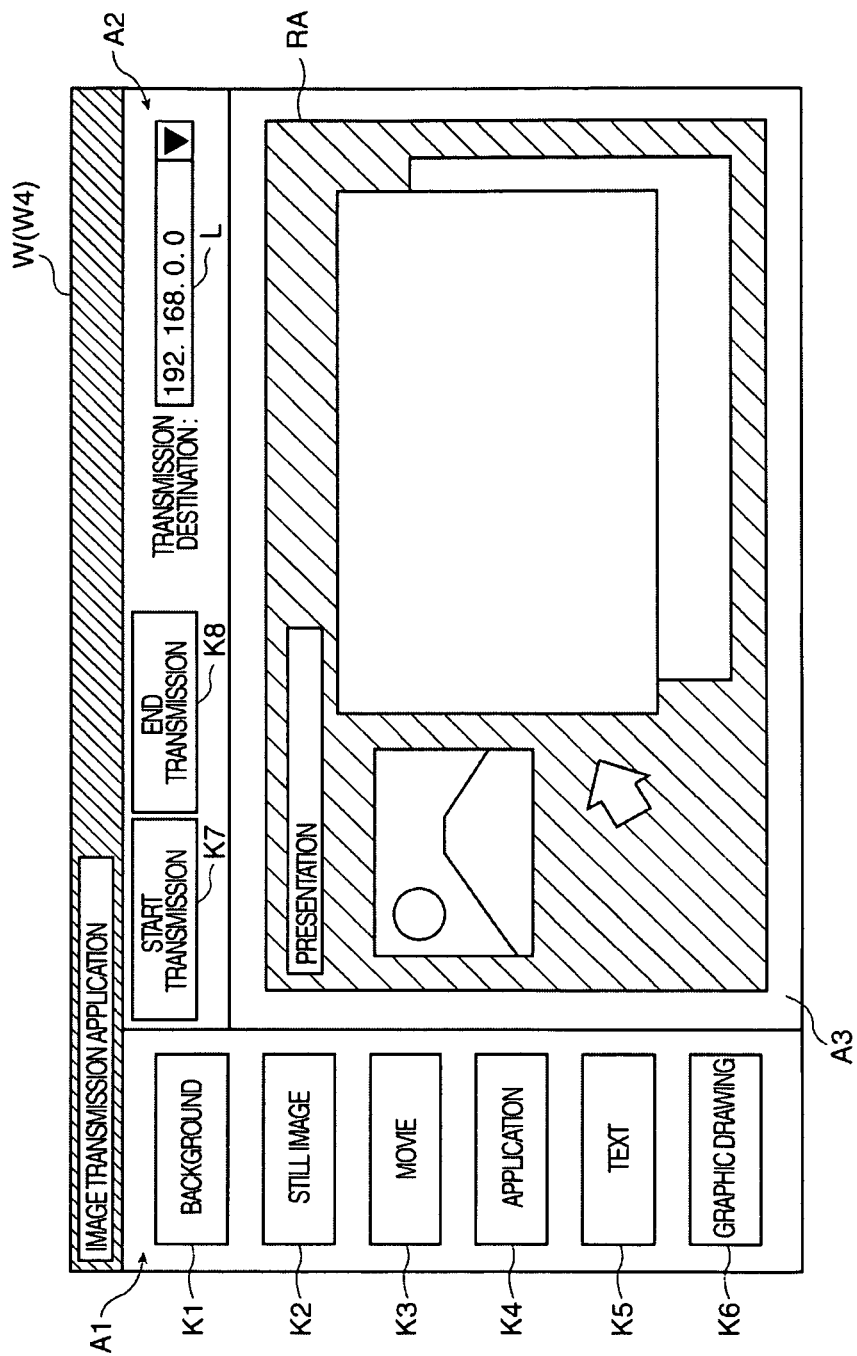
FIG. 3 shows a screen at the time of executing an image transmission application in the embodiment.

FIG. 3 shows the screen at the time of executing the image transmission application in an enlarged manner.

Now, the screen at the time of execution, which is displayed at the time of executing the image transmission application, will be described.

The screen at the time of executing the image transmission application is formed and displayed in the window W4 by the operation image generating unit 34. This screen at the time of execution includes a first operation area A1, a second operation area A2, and a work area A3, as shown in FIG. 3.

In the first operation area A1, six keys K1 to K6 are arranged representing "background", "still image", "movie", "application", "text", and "graphic drawing".

In the second operation area A2, a "start transmission" key K7, an "end transmission" key K8, and a list L which enables selection of an external device connected to the PC 3 are arranged. In this embodiment, the IP address of the external device is employed as the display item of the list L. However, a number set for the external device, a character string indicating the device type, and so on may also be employed.

In the work area A3, a layout area RA is arranged in which the image size (image display size) that can be displayed by the external device selected in the list L is reduced.

In the screen at the time of execution, when an external device (transmission destination device) to become the transmission destination of image data is selected from the list L arranged in the second operation area A2, the layout area RA is displayed in the work area A3. As each of the keys K1 to K6 is entered in this state, the background image of the layout area RA can be set and an object can be arranged into the layout area RA.

In this embodiment, an object refers to a still image, a movie, a screen at the time of execution of an application program, a text, and a graphic.

Specifically, if the "background" key K1 is entered, a dialog for selecting a still image file is displayed and the selected image file is set as the background image in the layout area RA.

If the "still image" key K2 is entered, a dialog for selecting a still image file is displayed. If the "movie" key K3 is entered, a dialog for selecting a movie file is displayed. Then, the thumbnail of the image file selected in these dialogs is arranged in the layout area RA as an image.

If the "application" key K4 is entered, a list for selecting an application program that is not the image transmission application is displayed and the image of the selected application (for example, an image formed by expanding or contracting the screen at the time of executing the application) is arranged in the layout area RA.

The position and size of these images can be adjusted in the layout area RA by an input operation (for example, dragging) to the operation unit 31.

Figure 4:
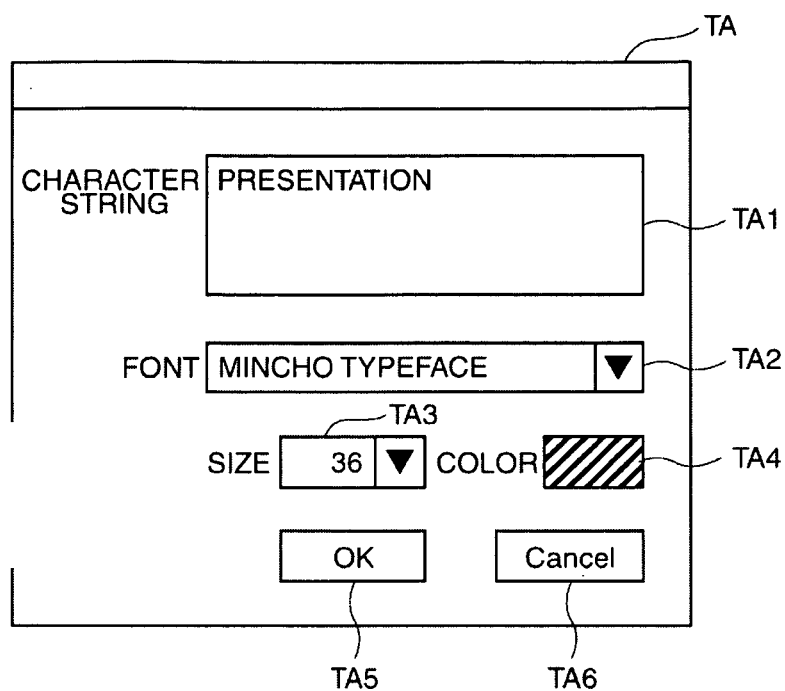
FIG. 4 shows a character input area in the embodiment.

FIG. 4 shows a character input area TA.

If the "text" key K5 is entered, the character input area TA shown in FIG. 4 is displayed. In this character input area TA, a character string input section TA1, a font setting section TA2, a font size setting section TA3, a font color setting section TA4, an "OK" key TA5 and a "Cancel" key TA6 are provided. If the "OK" key TA5 is entered after a character string is inputted (for example, "presentation" is inputted) in the character string input section TA1, the inputted character string (for example, "presentation") is arranged with the preset font, size and color in the layout area RA, as shown in FIG. 3. If the "Cancel" key TA6 is entered, the input character string is not arranged in the layout area RA and the character input area TA is turned into a non-display state.

Referring again to FIG. 3, if the "graphic drawing" key K6 is entered, a graphic selection area is displayed. In this graphic selection area, for example, graphic patterns such as rectangle, triangle and circle, and graphic patterns such as straight line, curve and arrow are displayed as selection items. If a predetermined graphic pattern is selected, this graphic pattern is arranged in the layout area RA. The position and size of the graphic pattern can be adjusted in the layout area RA by an input operation to the operation unit 31.

Each of the image, character string and graphic pattern inserted in the layout area RA can be deleted from the layout area RA.

If the "start transmission" key K7 in the second operation area A2 is entered, a packet including image data of the background image, image, character string and graphic pattern that are set in the layout area RA is transmitted to the external device selected from the list L. In this case, if the movie and the application are selected, the control unit 37 continues to transmit a packet including image data of the movie and the application to the selected external device.

If the "end transmission" key K8 is entered, the transmission of the packet is ended.

Figure 5:
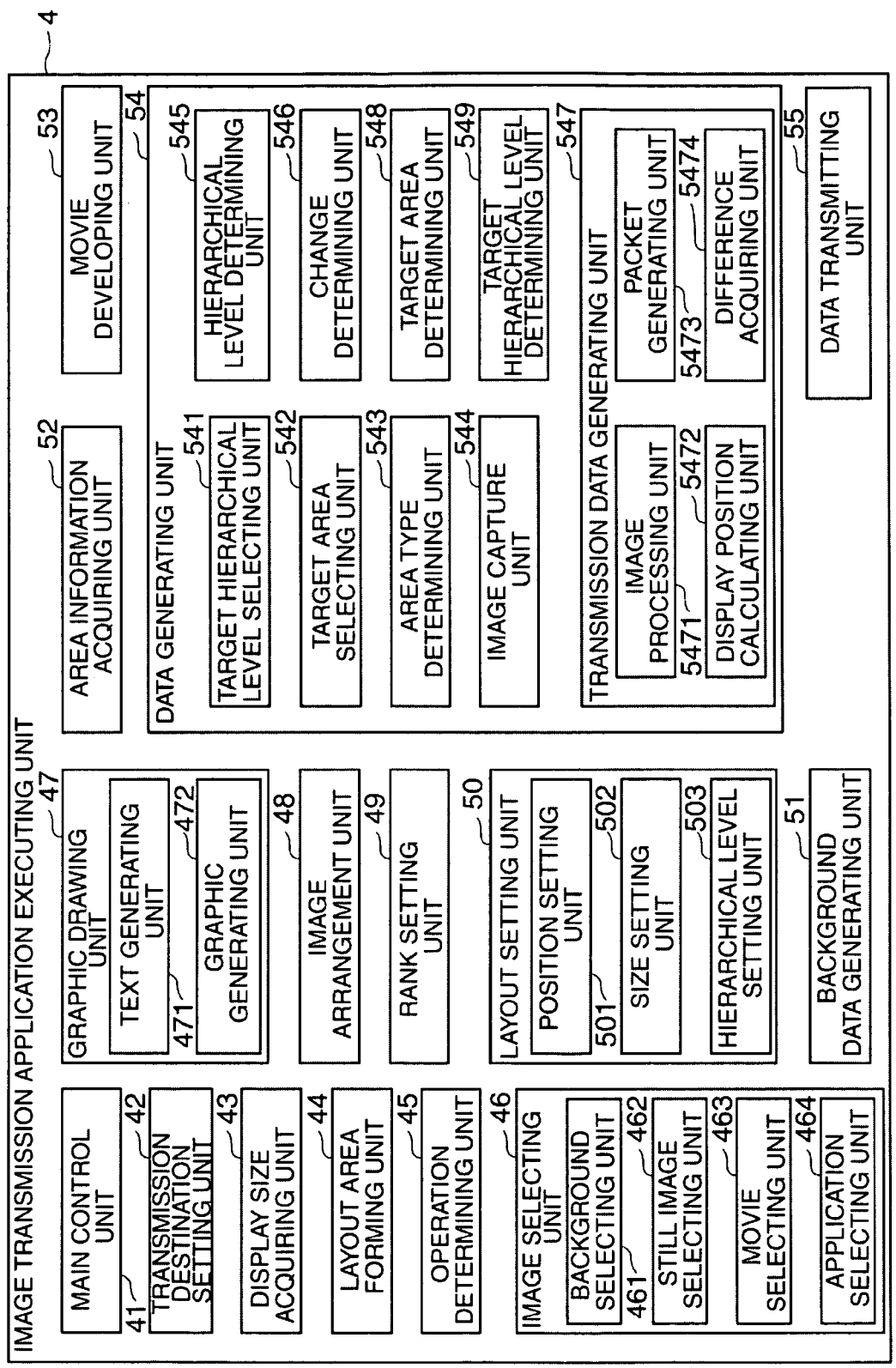
FIG. 5 is a block diagram showing the configuration of an image transmission application executing unit in the embodiment.

FIG. 5 is a block diagram showing the configuration of the image transmission application executing unit 4.

To execute the image transmission application as described above, the image transmission application executing unit 4 includes a main control unit 41, a transmission destination setting unit 42, a display size acquiring unit 43, a layout area forming unit 44, an operation determining unit 45, an image selecting unit 46, a graphic drawing unit 47, an image arrangement unit 48, a rank setting unit 49, a layout setting unit 50, a background data generating unit 51, an area information acquiring unit 52, a movie developing unit 53, a data generating unit 54, and a data transmitting unit 55, as shown in FIG. 5.

The main control unit 41 controls the overall operation of the image transmission application executing unit 4. The main control unit 41 causes the operation image generating unit 34 to generate and display the screen at the time of execution, as the image transmission application is executed. The main control unit 41 also causes the functional units 42 to 55 to function according to the need, thus controlling the execution state of the image transmission application.

The transmission destination setting unit 42 sets the external device selected in the list L as the transmission destination device of the image data.

The display size acquiring unit 43 acquires the image display size of the transmission destination device.

The layout area forming unit 44 causes the layout area RA to be displayed in the screen at the time of execution on the basis of the acquired image display size.

The operation determining unit 45 determines the user's operation to the operation unit 31 at the time of executing the image transmission application.

The image selecting unit 46, together with the graphic drawing unit 47, which will be described, is equivalent to the selecting unit according to the invention. The image selecting unit 46 executes processing corresponding to a function executed at the time of entering the keys K1 to K4 and selects an object which forms a display image by the external device. This image selecting unit 46 includes a background selecting unit 461, a still image selecting unit 462, a movie selecting unit 463, and an application selecting unit 464.

The background selecting unit 461 displays the dialog when the "background" key K1 is entered, and sets the path of the selected still image file or the like in a transmission target list stored in the storage unit 32.

The still image selecting unit 462 displays the dialog when the "still image" key K2 is entered, and sets the path of the selected still image file and the position, size and so on of the image in the layout area RA, in the transmission target list.

The movie selecting unit 463 displays the dialog when the "movie" key K3 is entered, and sets the path of the selected movie file and the position, size and so on of the image in the layout area RA, in the transmission target list. The reproduction of the movie file is started by the movie developing unit 53, which will be described later, when the "start transmission" key K7 is entered.

The application selecting unit 464 displays the list when the "application" key K4 is entered, and sets the name of the selected application and the position, size and so on of the image in the layout area RA, in the transmission target list.

The graphic drawing unit 47 has a text generating unit 471 and a graphic generating unit 472.

The text generating unit 471 displays the character input are TA when the "text" key K5 is entered, and develops image data of the inputted character string in the drawing memory 35.

The graphic generating unit 472 displays the graphic selection area when the "graphic drawing" key K6 is entered, and develops image data according to the selected graphic pattern in the drawing memory 35.

The text generating unit 471 and the graphic generating unit 472 also sets the type of the inputted character string and the selected graphic pattern, and the position, size and so on of the character string and the graphic pattern in the layout area RA, in the transmission target list.

The image arrangement unit 48 arranges the image of the selected and inputted object (background, still image, movie, application, character string and graphic pattern) on the layout area RA.

The rank setting unit 49 ranks (with numbers) each object arranged in the layout area RA in the setting order of the object. Specifically, every time an object is arranged, the rank setting unit 49 sets the rank of the object in the transmission target list.

The layout setting unit 50 includes a position setting unit 501, a size setting unit 502, and a hierarchical level setting unit 503.

The position setting unit 501 and the size setting unit 502 changes the position and size of the image of each object in the layout area RA in accordance with an input operation to the operation unit 31. The position setting unit 501 and the size setting unit 502 also updates the contents of the position and size of the object set in the transmission target list, on the basis of the changed position and size.

The hierarchical level setting unit 503 sets hierarchical levels indicating the overlap of each object. Specifically, if plural images are arranged to overlap each other in the layout area RA, the hierarchical level setting unit 503 sets the hierarchical levels of the corresponding objects to "1", "2", . . . "m" in order from the image located on the backmost side. The object corresponding to an image arranged without overlapping the other images has the hierarchical level of "1". Each of the objects corresponding to plural images arranged to overlap one object and without overlapping each other has a hierarchical value obtained by adding 1 to the hierarchical level of the one object. Every time each image in the layout area RA is operated, the hierarchical level setting unit 503 updates the hierarchical level of each object in the image transmission list.

The following functional units 51 to 55 operate when the "start transmission" key K7 is entered.

The background data generating unit 51 resizes the image data of the still image file that is set as the background in the image transmission list, in accordance with the image display size of the transmission destination device, and generates a packet conforming to the communication format with the transmission destination device from the resized image data. This packet is transmitted to the transmission destination device by the data transmitting unit 55. If the background is not set, the background data generating unit 51 generates a packet according to image data of a black image.

The area information acquiring unit 52 acquires the position, size, rank, hierarchical level, type (one of the types of still image, movie, application, text, and graphic pattern) or the like of each object that is set in the image transmission list.

The movie developing unit 53 develops the movie file that is set in the image transmission list, in the drawing memory 35.

The data generating unit 54 generates a packet including the image data (image data according to each object) except for the background of the display image to be displayed at the transmission destination device. Specifically, the data generating unit 54 generates a packet including the image data of the object in order of the hierarchical level of the object. The data generating unit 54 includes a target hierarchical level selecting unit 541, a target area selecting unit 542, an area type determining unit 543, an image capture unit 544, a hierarchical level determining unit 545, a change determining unit 546, a transmission data generating unit 547, a target area determining unit 548, and a target hierarchical level determining unit 549.

The target hierarchical level selecting unit 541 selects the hierarchical level where an object to be a target (target object) is situated, as a target hierarchical level.

The target area selecting unit 542 selects a target object from objects situated at the target hierarchical level. If plural objects exist at the same hierarchical level, the target area selecting unit 542 selects a target object in order from the object of the lowest rank of the ranks set by the rank setting unit 49.

The area type determining unit 543 determines the type of a target object. Specifically, the area type determining unit 543 determines whether the target object is a still object (still image, text or graphic pattern) having image data that does not change with time or a dynamic object (movie and application) having image data that changes with time in accordance with the information of each object acquired by the area information acquiring unit 52.

The image capture unit 544 captures the image data of the target object developed in the drawing memory 35 and copies the image data to the frame memory 36. In this case, if the target object is a dynamic object, the image capture unit 544 copies image data for one frame to the frame memory 36.

The hierarchical level determining unit 545 determines whether the target hierarchical level is a first level or not.

The change determining unit 546 determines whether there is a change between the image data copied to the frame memory 36 and already copied image data if the target object is a dynamic object.

The transmission data generating unit 547 generates a packet to be transmitted to the transmission destination device on the basis of the image data of the target object copied to the frame memory 36 and the information of each object acquired by the area information acquiring unit 52. The transmission data generating unit 547 includes an image processing unit 5471, a display position calculating unit 5472, a packet generating unit 5473, and a difference acquiring unit 5474.

The image processing unit 5471 resizes the image data copied to the frame memory 36 so that the image display size of the transmission destination device with respect to the size of the layout area RA coincides with the size of the image data with respect to the size of the target object in the layout area RA.

The display position calculating unit 5472 calculates the display position of the image data of the target object in the display image at the transmission destination device on the basis of the position of the target object in the layout area RA (the position of the target object that is set in the image transmission list).

The packet generating unit 5473 is equivalent to the transmission data generating unit according to the invention. The packet generating unit 5473 generates a packet having header information that includes the size changed by the image processing unit 5471 and the display position calculated by the display position calculating unit 5472, and the resized image data.

If it is determined by the change determining unit 546 that there is a change between the newly copied image data and the already copied image data of the image data of the same target object, the difference acquiring unit 5474 acquires, from the newly copied image data, a minimum rectangular area equivalent to the difference from the already copied image data as differential image data.

If the differential image data is acquired by the difference acquiring unit 5474, the image processing unit 5471 resizes the differential image data and the display position calculating unit 5472 calculates the display position with respect to the differential image data.

The target area determining unit 548 determines whether all the objects at the target hierarchical level are set as target objects or not. If it is determined by the target area determining unit 548 that all the objects at the target hierarchical level are set as target objects, the target area selecting unit 542 selects the object of the next rank as a target object.

The target hierarchical level determining unit 549 determines whether all the hierarchical levels are selected as target hierarchical levels or not. Here, if it is determined by the target hierarchical level determining unit 549 that there is a hierarchical level that is not selected as a target hierarchical level, the target hierarchical level selecting unit 541 selects the hierarchical level indicated by the value obtained by adding 1 to the value "n" indicating the current hierarchical level, as a target hierarchical level. Meanwhile, if it is determined by the target hierarchical level determining unit 549 that all the hierarchical levels are selected as target hierarchical levels, the target hierarchical level selecting unit 541 sets "1" for "n" and selects the first level as a target hierarchical level.

The data transmitting unit 55 transmits the packets generated by the background data generating unit 51 and the data generating unit 54 to the transmission destination device.

Processing at the Time of Executing Image Transmission Application

Figure 6:
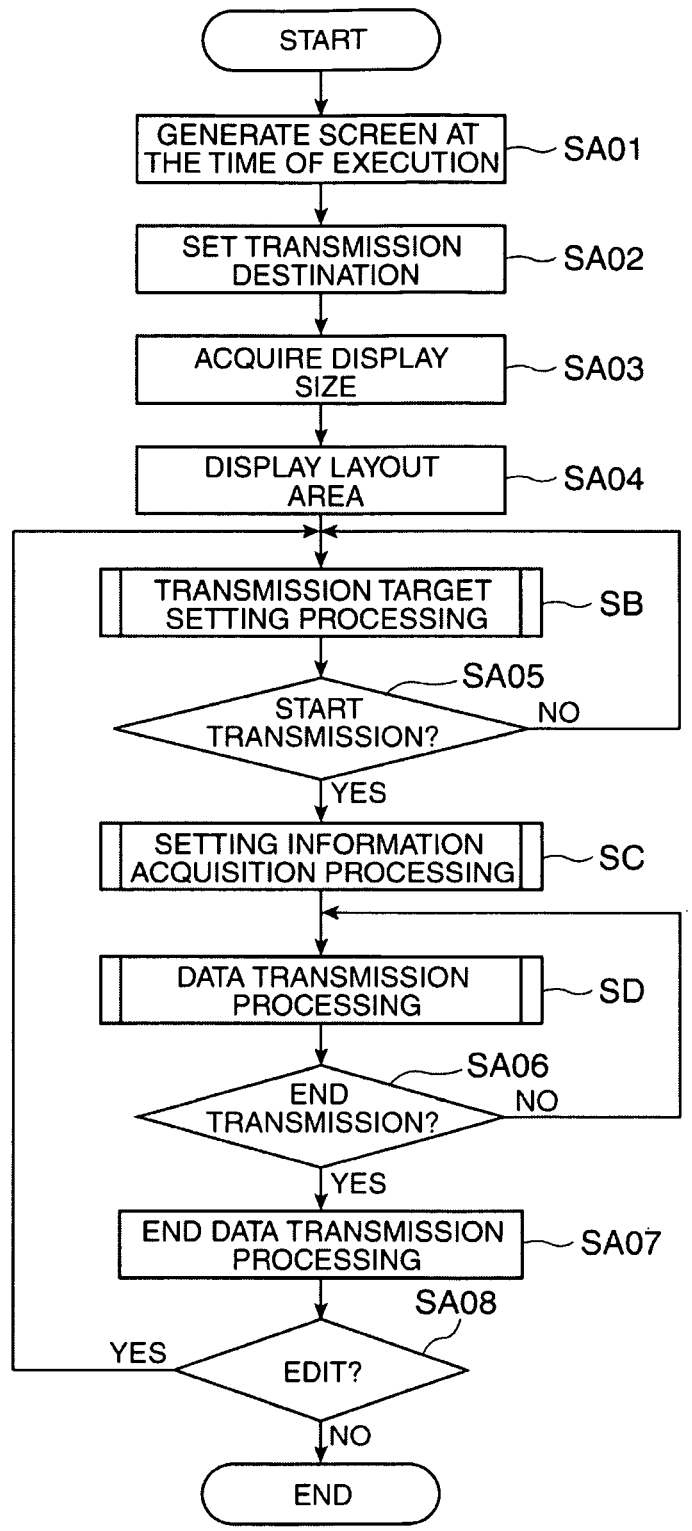
FIG. 6 is a flowchart showing processing at the time of executing the image transmission application in the embodiment.

FIG. 6 is a flowchart showing processing at the time of executing the image transmission application.

If an operation to execute the image transmission application is carried out by the user, the image transmission application executing unit 4 executes the following processing at the time of executing the image transmission application.

In the processing at the time of executing the image transmission application, first, the main control unit 41 causes the operation image generating unit 34 and the image display unit 33 to display the screen at the time of executing the image transmission application (see FIG. 2 and FIG. 3), as shown in FIG. 6 (step SA01).

After that, the transmission destination setting unit 42 sets an external device selected by the user, as a transmission destination device (step SA02). The display size acquiring unit 43 acquires the image display size from the set transmission destination device (step SA03). Then, the layout area forming unit 44 causes the operation image generating unit 34 to display the layout area RA formed by reducing the image display size in a predetermined proportion, in the work area A3 in the screen at the time of execution (step SA04).

After that, the image transmission application executing unit 4 carries out transmission target setting processing SB.

Figure 7:
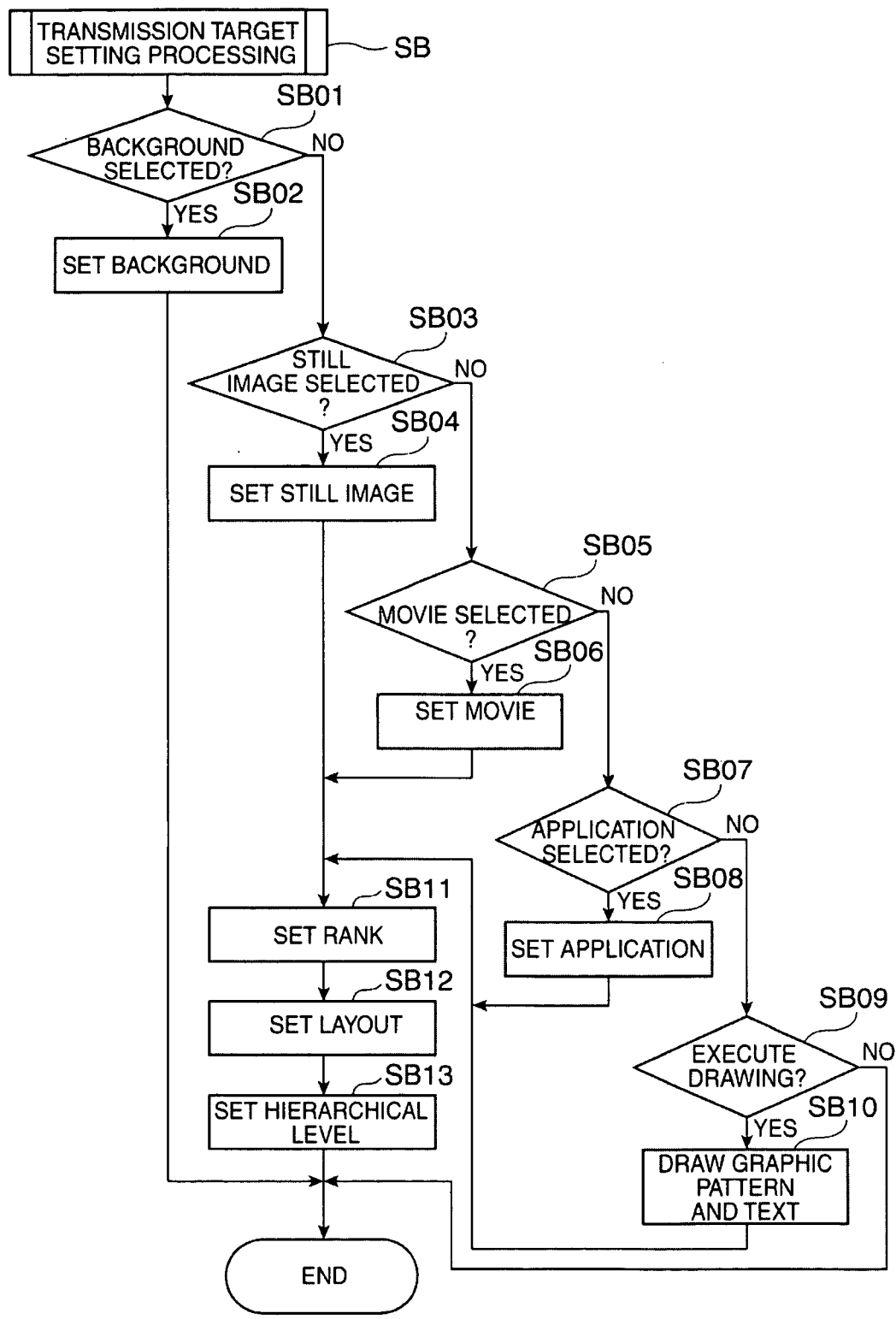
FIG. 7 is a flowchart showing transmission target setting processing in the embodiment.

FIG. 7 is a flowchart showing the transmission target setting processing SB.

The transmission target setting processing SB is the processing to set the above object.

In this transmission target setting processing SB, as shown in FIG. 7, first, the operation determining unit 45 determines whether the "background" key K1 is entered and a still image file to be set as the background is selected or not (step SB01). If it is determined that a still image file is selected, the background selecting unit 461 sets the path of the selected still image file in the image transmission list. In this case, the image arrangement unit 48 develops the selected still image file in the drawing memory 35 and sets the image of the still image file as the background of the layout area RA (step SB02). After that, the image transmission application executing unit 4 ends the transmission target setting processing SB.

Meanwhile, if it is determined that the background is not selected, the operation determining unit 45 determines whether the "still image" key K2 is entered and a still image file is selected or not (step SB03). Then, if it is determined that a still image file is selected, the still image selecting unit 462 sets at least the path of the selected still image file and so on in the image transmission list. In this case, the image arrangement unit 48 arranges the thumbnail of the still image file with a predetermined size on the layout area RA (step SB04). After that, the image transmission application executing unit 4 shifts the processing to step SB11.

If it is determined that a still image is not selected, the operation determining unit 45 determines whether the "movie" key K3 is entered and a movie file is selected or not (step SB05). Then, if it is determined that a movie file is selected, the movie selecting unit 463 sets the path of the selected movie file and so on, to the image transmission list. In this case, the image arrangement unit 48 arranges the thumbnail of the movie file with a predetermined size on the layout area RA (step SB06). After that, the image transmission application executing unit 4 shifts the processing to step SB11.

Meanwhile, if it is determined that a movie is not selected, the operation determining unit 45 determines whether the "application" key K4 is entered and an application program is selected or not (step SB07). Then, if it is determined that an application program is selected, the application selecting unit 464 sets the information (name and so on) of the selected application program in the image transmission list. In this case, the image arrangement unit 48 arranges the image of the screen at the time of executing the selected application program, with a predetermined size on the layout area RA (step SB08). After that, the image transmission application executing unit 4 shifts the processing to step SB11.

If it is determined that an application program is not selected, the operation determining unit 45 determines whether the "text" key K5 or "graphic drawing" key K6 is entered and input of a text or selection of a graphic pattern is carried out or not (step SB09). Then, if it is determined that input of a text or selection of a graphic pattern is carried out, the text generating unit 471 and the graphic generating unit 472 respectively sets the information of the inputted text and the selected graphic pattern, to the image transmission list, and the image arrangement unit 48 arranges the image of the text and graphic pattern on the layout area RA (step SB10). After that, the image transmission application executing unit 4 shifts the processing to step SB11.

Meanwhile, if it is determined by the operation determining unit 45 that input of a text or selection of a graphic pattern is not carried out, the image transmission application executing unit 4 ends the transmission target setting processing SB.

In step SB11, the rank setting unit 49 sets the rank of the objects in order of setting the objects into the image transmission list (in order of arrangement of the still image, movie, application, text, and graphic pattern in the layout area RA) (step SB11).

If the position and size of the image in the layout area RA is changed in accordance with the user's operation, the position setting unit 501 and the size setting unit 502 updates the contents of the position and size of the corresponding object in the image transmission list (step SB12). In this case, if there is a change in the hierarchical levels of the objects, the hierarchical level setting unit 503 updates the hierarchical level of each object in the image transmission list (step SB13).

Then, the transmission target setting processing SB ends.

Referring again to FIG. 6, after the transmission target setting processing SB, the operation determining unit 45 determines whether the "start transmission" key K7 is entered or not (step SA05). Here, if it is determined by the operation determining unit 45 that the key K7 is not entered, the image transmission application executing unit 4 repeats execution of the transmission target setting processing SB.

On the other hand, if it is determined that the key K7 is entered, the image transmission application executing unit 4 executes setting information acquisition processing SC.

Figure 8:
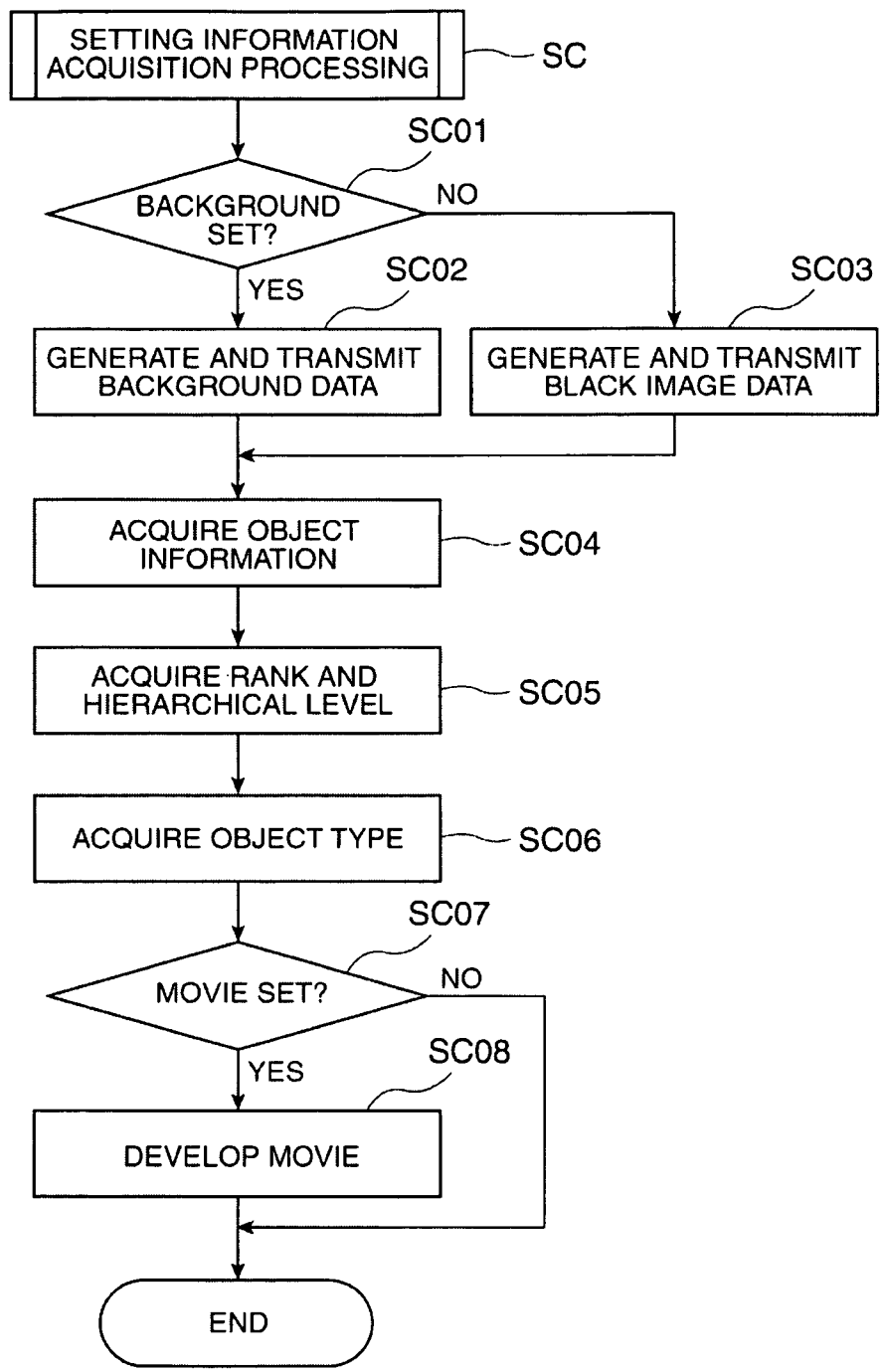
FIG. 8 is a flowchart showing setting information acquisition processing in the embodiment.

FIG. 8 is a flowchart showing the setting information acquisition processing SC.

The setting information acquisition processing SC is the processing to transmit the image data that is set as the background and to acquire the information related to each object that is set in the layout area RA.

In this setting information acquisition processing SC, first, the background data generating unit 51 determines whether a background is set in the image transmission list or not, as shown in FIG. 8 (step SC01).

Here, if it is determined that a background is set, the background data generating unit 51 generates a packet based on the still image file that is set as the background in the image transmission list, and the data transmitting unit 55 transmits the packet to the transmission destination device (step SC02).

Meanwhile, if it is determined that a background is not set, the background data generating unit 51 generates a packet according to black image data and the data transmitting unit 55 transmits the transmission packet (step SC03). The transmission destination device which receives the packet according to the background displays an image based on the packet as the background of the display image.

After these steps SC02 and SC03, the area information acquiring unit 52 acquires the position and size of each object that is set in the image transmission list (step SC04). The area information acquiring unit 52 also acquires the rank and hierarchical level of each object from the image transmission list (step SC05) and acquires the type of each object (step SC06).

After that, the movie developing unit 53 determines whether a movie file is set in the image transmission list or not (step SC07). If it is determined that a movie file is set, the movie developing unit 53 develops the movie file in the drawing memory 35 (step SC08).

Then, the setting information acquisition processing SC ends.

Figure 9:
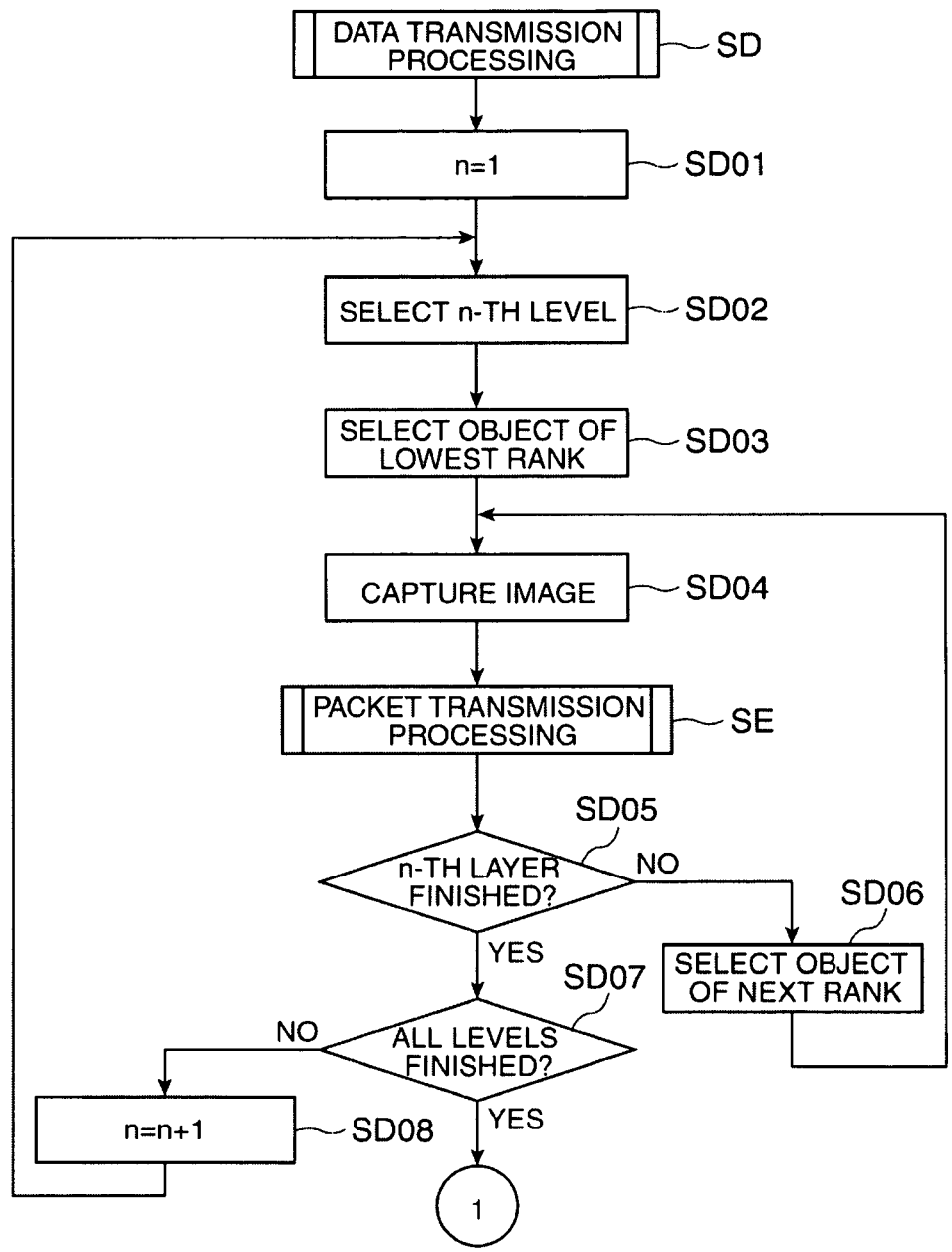
FIG. 9 is a flowchart showing data transmission processing in the embodiment.
Figure 10:
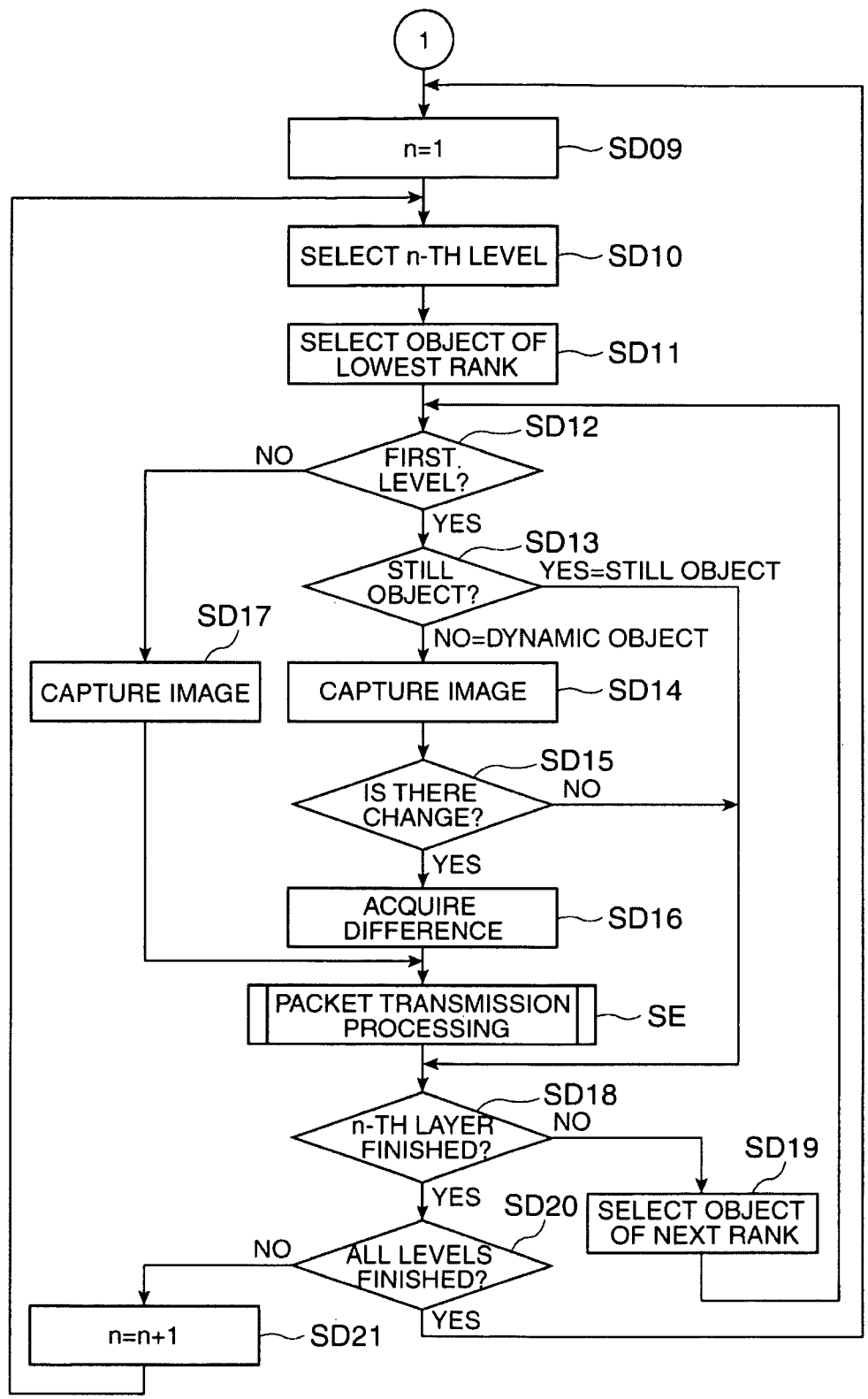
FIG. 10 is a flowchart showing data transmission processing in the embodiment.

FIG. 9 and FIG. 10 are flowcharts showing data transmission processing SD.

Referring again to FIG. 6, after the setting information acquisition processing SC, the image transmission application executing unit 4 executes the data transmission processing SD. This data transmission processing SD is the processing to sequentially select a target object and sequentially transmits a packet based on image data of the target object.

In the data transmission processing SD, first, the target hierarchical level selecting unit 541 of the data generating unit 54 sets "1" as the value "n" indicating a target hierarchical level (SD01) and selects the n-th level as a target hierarchical level (a first level at this stage) (step SD02), as shown in FIG. 9.

Then, the target area selecting unit 542 selects the object of the lowest rank as a target object from objects situated at the n-th level (step SD03).

Next, the image capture unit 544 captures image data corresponding to the target object on the drawing memory 35 and copies the image data to the frame memory 36 (step SD04). In this case, if the target object is a dynamic object, image data for one frame is copied.

After that, the image transmission application executing unit 4 executes packet transmission processing SE.

Figure 11:
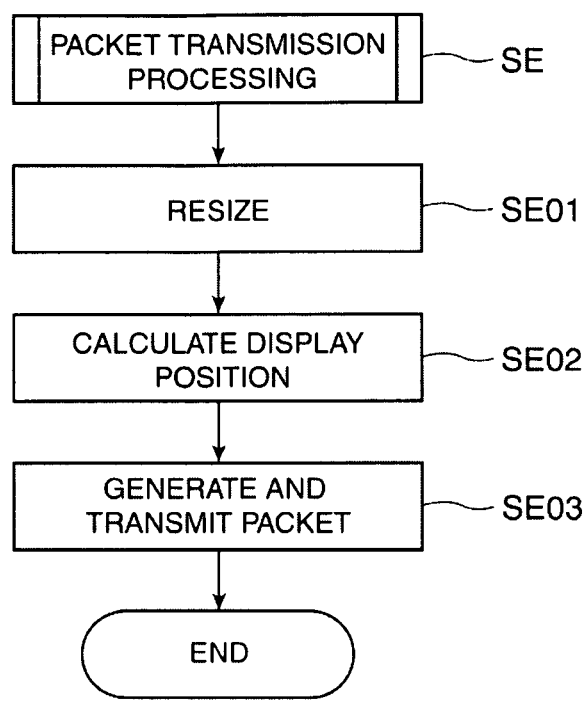
FIG. 11 is a flowchart showing packet transmission processing in the embodiment.

FIG. 11 is a flowchart showing the packet transmission processing SE.

The packet transmission processing SE is the processing to generate a packet based on the image data copied to the frame memory 36 and transmits the packet to the transmission destination device.

In this packet transmission processing SE, first, the image processing unit 5471 of the transmission data generating unit 547 resizes image data according to the copied target object in accordance with the image display size at the transmission destination device (step SE01), as shown in FIG. 11.

The display position calculating unit 5472 calculates the coupling position of the image of the target object in the display image at the transmission destination device on the basis of the position of the image of the target object in the layout area RA (step SE02).

Then, the packet generating unit 5473 generates a packet which includes header information including the position of the resized image data, and the resized image data, and the data transmitting unit 55 transmits the packet to the transmission destination device (step SE03).

Then, the packet transmission processing SE ends.

Referring again to FIG. 9, after the packet transmission processing SE, the target area determining unit 548 determines whether all the objects at the target hierarchical level are selected as target objects or not (step SD05).

Here, if it is determined that there are objects that are not selected, the target area selecting unit 542 selects the object of the lowest rank as a target object from the objects that are situated at the target hierarchical level and are not selected as target objects (step SD06).

After that, the image transmission application executing unit 4 returns to step SD04.

Meanwhile, if it is determined that all the objects at the target hierarchical level are selected as target objects, the target hierarchical level determining unit 549 determines whether all the hierarchical levels are selected as target hierarchical levels or not (step SD07). Here, if it is determined that there is a hierarchical level that is not selected, the target hierarchical level selecting unit 541 adds 1 to the value "n" indicating a target hierarchical level (step SD08) and the processing returns to step SD02. Thus, the hierarchical level indicated by the value "n" is selected as a target hierarchical level.

If it is determined that all the hierarchical levels are selected as target hierarchical levels, the image transmission application executing unit 4 shifts the processing to step SD09.

Figure 12:
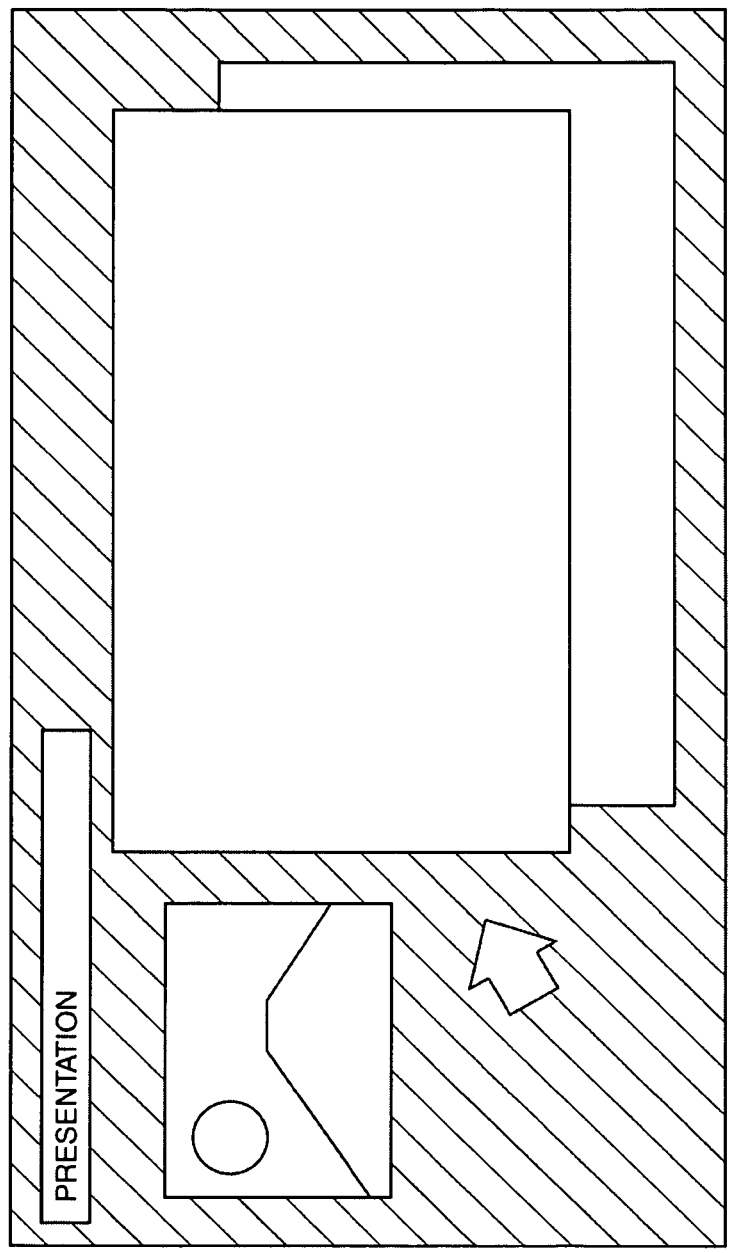
FIG. 12 shows a display image displayed by a transmission destination device in the embodiment.

FIG. 12 shows a display image display at the transmission destination device on the basis of the image data transmitted from the PC 3.

Through the processing up to this point, image data (packet) of a display image for the first one frame at the transmission destination device is transmitted. In the transmission destination device which receives such image data, a display image including an image of each object is displayed in the layout of each object that is set in the layout area RA, as shown in FIG. 12.

In step SD09, the target hierarchical level selecting unit 541 sets "1" as the value "n" indicating a target hierarchical level (step SD09), as shown in FIG. 10, and the hierarchical level indicated by this value "n" (the first level at this point) is selected as a target hierarchical level (step SD10).

After that, the target area selecting unit 542 selects the object of the lowest rank as a target object from the objects situated at the n-th level, which is the target hierarchical level (step SD11).

Next, the hierarchical level determining unit 545 determines whether the current target hierarchical level is the first level or not (step SD12). If it is determined in this determination processing that the target hierarchical level is the first level, the area type determining unit 543 determines whether the target object is a still object (still image, text and graphic pattern) or a dynamic object (movie and application) (step SD13). In this case, if it is determined that the target object is a still object, the image transmission application executing unit 4 shifts the processing to step SD18.

Here, for a still object situated at the first level, which is the backmost hierarchical level, image data need not be updated. The image data is already transmitted when the first frame of the image data is transmitted. Therefore, since the image data of the still object of the first level is not transmitted at the time of transmitting the second and subsequent frames of the image data, re-transmission of the same data is restrained and the amount of transmission data is reduced.

Meanwhile, if it is determined that the target object is a dynamic object, the image capture unit 544 copies the image data for one frame of the target object from the drawing memory 35 to the frame memory 36 (step SD14).

After that, the change determining unit 546 compares the newly copied image data with the already copied image data and determines whether there is a change between these image data (step SD15). Here, if it is determined that there is no change, it is determined then that the image data according to the target object need not be updated even if another object is arranged to overlap the target object. The image transmission application executing unit 4 shifts the processing to step SD18.

If it is determined by the change determining unit 546 that there is a change, the difference acquiring unit 5474 acquires differential image data which serves as the difference between the newly copied image data and the already copied image data, from the newly copied image data (step SD16).

Then, the image transmission application executing unit 4 generates and transmits a packet based on the differential image data by the packet transmission processing SE and shifts the processing to step SD18.

Meanwhile, if it is determined in the determination in step SD12 that the target hierarchical level is not the first level, the image capture unit 544 copies the image data of the target object from the drawing memory 35 to the frame memory 36 (step SD17). Then, the image transmission application executing unit 4 generates and transmits a packet based on the copied image data by the packet transmission processing SE and shifts the processing to step SD18.

Therefore, for a target object that is not situated at the first level, that is, for a target object in the case where another object is situated on the backside, image data is transmitted frame by frame to the transmission destination device. Thus, even when there is a change in another object situated on the back side of the target object and the image of this another object is updated, a proper image can be displayed in the display area of the image of the target object.

In step SD18, as in the above-described step SD05, the target area determining unit 548 determines whether the all the objects at the target hierarchical level are selected as target objects or not (step SD18). If it is determined that there are objects that are not selected, the target area selecting unit 542 selects, as a target object, the object of the minimum rank that is not selected as a target object at the target hierarchical level (step SD19). The image transmission application executing unit 4 shifts the processing to step SD11.

Meanwhile, if it is determined by the target area determining unit 548 that all the objects at the target hierarchical level are selected as target objects, the target hierarchical level determining unit 549 determines whether all the hierarchical levels are selected as target hierarchical levels or not (step SD20). If it is determined by the target hierarchical level determining unit 549 that there is a hierarchical level that is not selected, the target hierarchical level selecting unit 541 adds 1 to the value "n" indicating a target hierarchical level (step SD21). The processing returns to step SD10.

If it is determined by the target hierarchical level determining unit 549 that all the hierarchical levels are selected as target hierarchical levels, the image transmission application executing unit 4 shifts the processing to step SD09 and becomes ready for the transmission of image data according to the next frame.

Thus, each object is sequentially selected and the image data according to the object is sequentially transmitted to the transmission destination device. Therefore, at the transmission destination device, the image is updated frame by frame.

When the image transmission application is being executed, the setting information acquisition processing SC and the data transmission processing SD are executed even if the window of the image transmission application is not active. Therefore, even if the window of another application is arranged to overlap the window of the image transmission application, or even if predetermined processing is carried out in another application (for example, notepad or the like), a packet having image data of each object that is set in the layout area RA and header information corresponding to the layout of each object is transmitted to the transmission destination device.

Referring again to FIG. 6, the operation determining unit 45 determines whether the "end transmission" key K8 is entered during the data transmission processing SD or not (step SA06). Here, if it is determined by the operation determining unit 45 that the key K8 is not entered, the image transmission application executing unit 4 continues executing the data transmission processing SD.

On the other hand, if it is determined by the operation determining unit 45 that the key K8 is entered, the main control unit 41 end the data transmission processing SD (step SA07).

After that, the operation determining unit 45 determines whether an editing operation is carried out to the screen at the time of executing the image transmission application or not (step SA08). If it is determined that an editing operation is carried out, the image transmission application executing unit 4 executes the transmission target setting processing SB again. If it is determined that an editing operation is not carried out and an operation to end the image transmission application is carried out, the image transmission application executing unit 4 ends the image transmission application.

The display system according to this embodiment as described above has the following effects.

(1) A packet (transmission data) including an object (background, still image, movie, and application) selected by the image selecting unit 46 and an object (character string and graphic pattern) inputted and selected by the graphic drawing unit 47 is generated, and the packet is transmitted to the transmission destination device (projector 2). Thus, images other than objects selected by the user of the PC 3 can be prevented from being included in a display image to be displayed at the transmission destination device. Therefore, the user of the PC 3 can freely set a display image at the transmission destination device and can prevent images which the user does not want others to see, from being displayed by the transmission destination device.

(2) Since the object layout (for example, the display position, size and so on) in a display image at the transmission destination device can be set by the layout setting unit 50, an image of an object can be displayed at a desired position and with a desired size in the display image. If plural objects are selected, images of these objects can be displayed to at least partly overlap each other. Thus, the degree of freedom in setting a display image at the transmission destination device can be improved.

(3) The layout area forming unit 44 forms and displays a layout area RA corresponding to the image display size of the transmission destination device acquired by the display size acquiring unit 43, on the screen at the time of executing the image transmission application. Then, the image arrangement unit 48 arranges an image corresponding to a selected and inputted object in the layout area RA. The layout setting unit 50 sets the layout of the image of the object in a display image at the transmission destination device in accordance with the layout of the image in the layout area RA. Thus, the setting state of the display image can be visually determined and the setting of the display image can be carried out easily.

(4) At the time of generating a packet as transmission data, the data generating unit 54 generates the packet in order from the object of the lowest hierarchical level, that is, the object on the backmost side. Accordingly, in a display image, the image of the object on the back side is updated first and the image of the object on the front side is updated later. Therefore, the front-back relation of the images of the objects in the display image can be prevented from collapsing. Thus, the display image can be displayed according to the preset layout.

(5) The data generating unit 54 generates a packet for each object. Thus, if a still object is arranged without other objects overlapping the still object, the image data of the still object is not re-transmitted. If a dynamic object having an image which needs updating is arranged, the image data of the movie can be sequentially transmitted to the transmission destination device. Therefore, the amount of data transmitted to the transmission destination device can be reduced.

Second Embodiment

Now, a display system according to a second embodiment of the invention will be described.

The display system according to this embodiment has a configuration similar to that of the display system 1. However, in the display system 1, image data of an object is transmitted to the transmission destination device every time a target object is selected. In contrast, in the display system according to this embodiment, a packet for one screen including image data of each object is generated and transmitted. The display system according to this embodiment differs from the display system 1 in this point. In the following description, the same parts or substantially the same parts as those already described are denoted by the same reference numerals and will not be described further in detail.

The display system according to this embodiment includes a projector 2 as an image display device, and a PC 3A as an image transmission device which transmits image data to the projector 2. The projector 2 and the PC 3A are connected by a LAN, as in the display system 1.

The PC 3A has the same configuration as the PC 3 except for having a control unit 37A instead of the control unit 37. The control unit 37A has the same configuration as the control unit 37 except for having an image transmission application executing unit 4A instead of the image transmission application executing unit 4.

Figure 13:
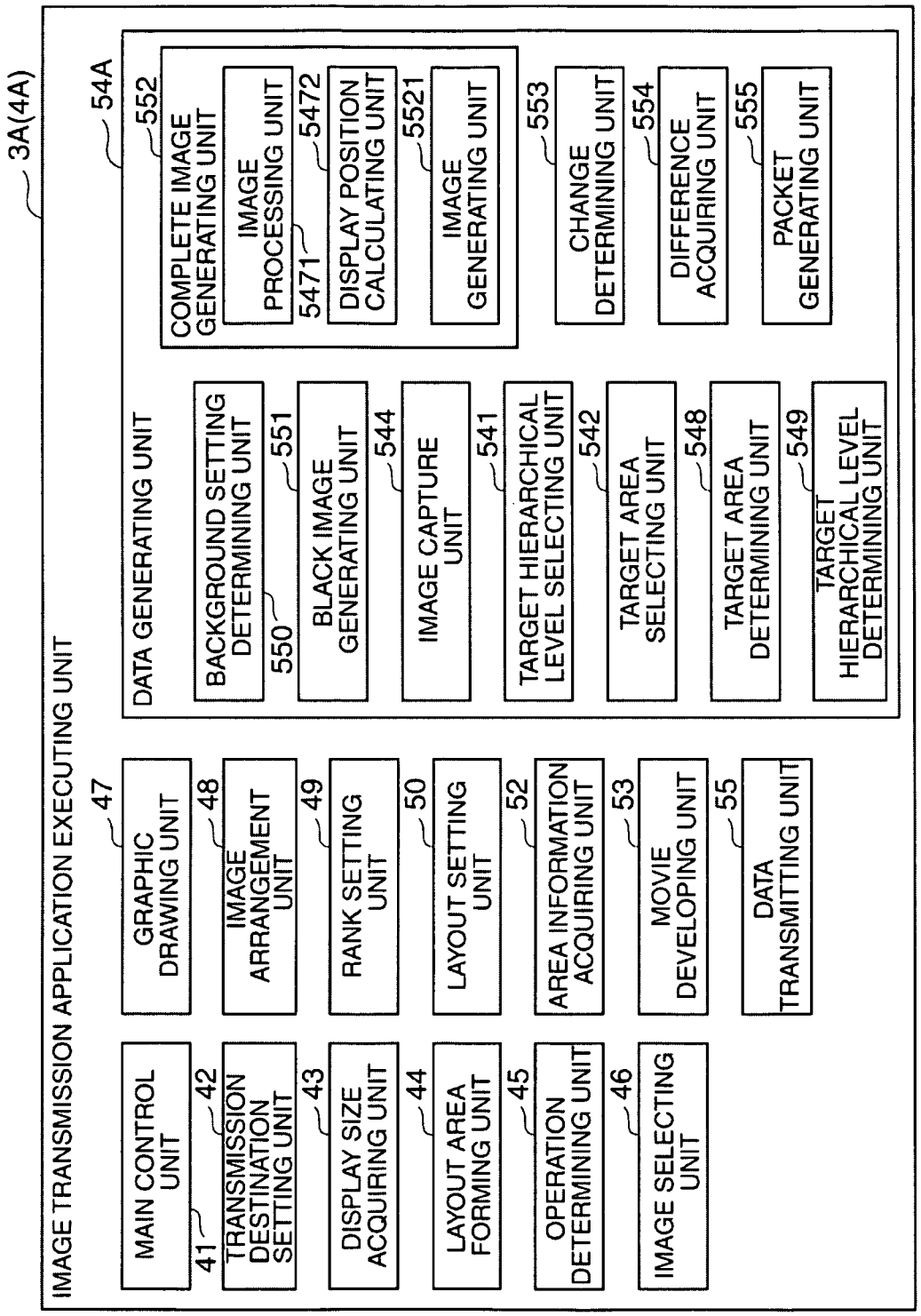
FIG. 13 is a block diagram showing an image transmission application executing unit which constitutes a PC of a display system according to a second embodiment of the invention.

FIG. 13 is a block diagram showing the configuration of the image transmission application executing unit 4A provided in the PC 3A of the display system according to this embodiment.

The image transmission application executing unit 4A reads an image transmission program stored in a storage unit 32 in accordance with a user's operation and executes an image transmission application. The image transmission application executing unit 4A includes a main control unit 41, a transmission destination setting unit 42, a display size acquiring unit 43, a layout area forming unit 44, an operation determining unit 45, an image selecting unit 46, a graphic drawing unit 47, an image arrangement unit 48, a rank setting unit 49, a layout setting unit 50, an area information acquiring unit 52, a movie developing unit 53, a data generating unit 54A, and a data transmitting unit 55, as shown in FIG. 13.

The data generating unit 54A generates a packet for one screen of a display image having image data of each object set in the layout area RA. The data generating unit 54A includes a background setting determining unit 550, a black image generating unit 551, an image capture unit 544, a target hierarchical level selecting unit 541, a target area selecting unit 542, a complete image generating unit 552, a target area determining unit 548, a target hierarchical level determining unit 549, a change determining unit 553, a difference acquiring unit 554, and a packet generating unit 555, as shown in FIG. 13.

Of these, the background setting determining unit 550 determines whether a still image file as a background is selected in an image transmission list or not.

If it is determined by the background setting determining unit 550 that a still image file as a background is not selected, the black image generating unit 551 generates black image data in the drawing memory 35.

The complete image generating unit 552 generates image data of a display image for one screen (a complete image for one frame including the background and the image of each object) to be displayed at the transmission destination device. The complete image generating unit 552 includes an image processing unit 5471, a display position calculating unit 5472, and an image generating unit 5521.

Of these, the image generating unit 5521 couples image data resized by the image processing unit 5471 to a position calculated by the display position calculating unit 5472 and thus generates image data of a display image for one screen on the frame memory 36.

The change determining unit 553 compares the image data for one screen that is newly generated in the frame memory 36 by the complete image generating unit 552 with already generated image data for one screen (image data of the previous frame) and thus determines whether there is a change between these image data or not.

If it is determined by the change determining unit 553 that there is a change, the difference acquiring unit 554 acquires differential image data that is the difference between the newly generated image data and the already generated image data, from the newly generated image data. For the image data of the first frame, since there is no image data as a comparison target, the entire image data that is newly generated is acquired as differential image data.

Figure 14:
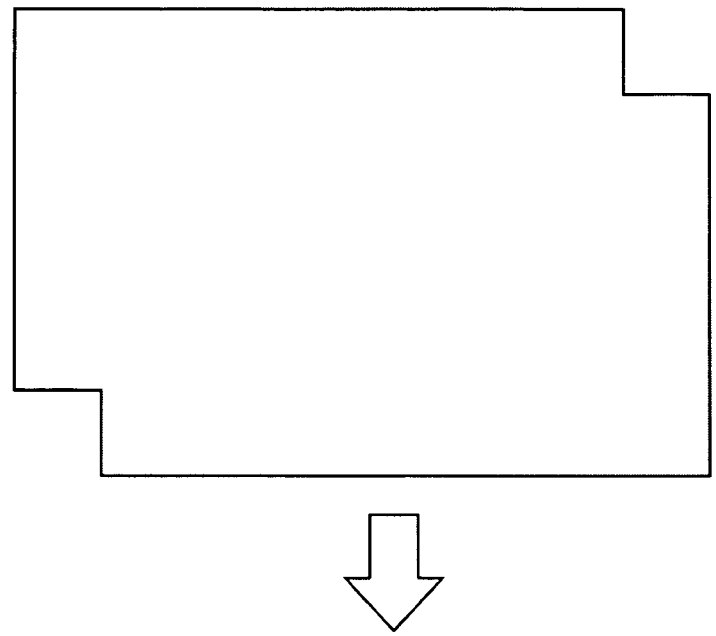
FIG. 14 shows an exemplary image data included in a packet in the embodiment.
Figure 14:
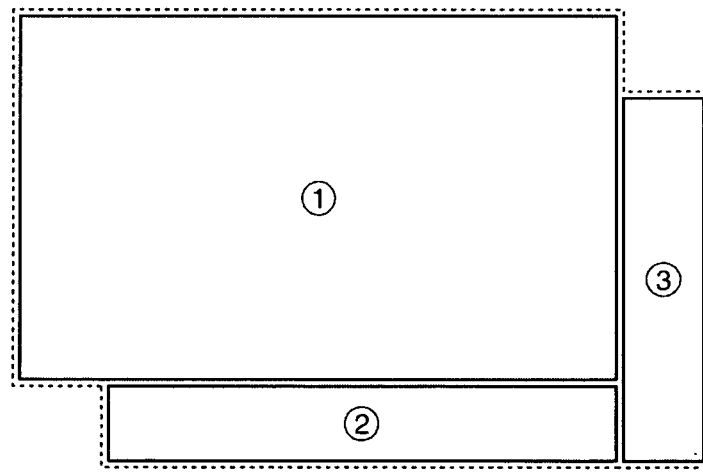

FIG. 14 shows an exemplary image data included in a packet generated by the packet generating unit 555.

The packet generating unit 555 is equivalent to the transmission data generating unit according to the invention. The packet generating unit 555 generates a packet including differential image data acquired by the difference acquiring unit 554 and header information indicating the display position (coupling position) of the image corresponding to the differential image data. This packet is transmitted to the transmission destination device by the data transmitting unit 55.

Now, an image corresponding to differential image data may not be rectangular, for example, as shown at the top of FIG. 14. In such a case, the packet generating unit 555 divides the image corresponding to the differential image data into plural rectangular areas and generates a packet based on rectangular image data corresponding to each rectangular area, as shown at the bottom of FIG. 14.

Processing at the Time of Executing Image Transmission Application

Figure 15:
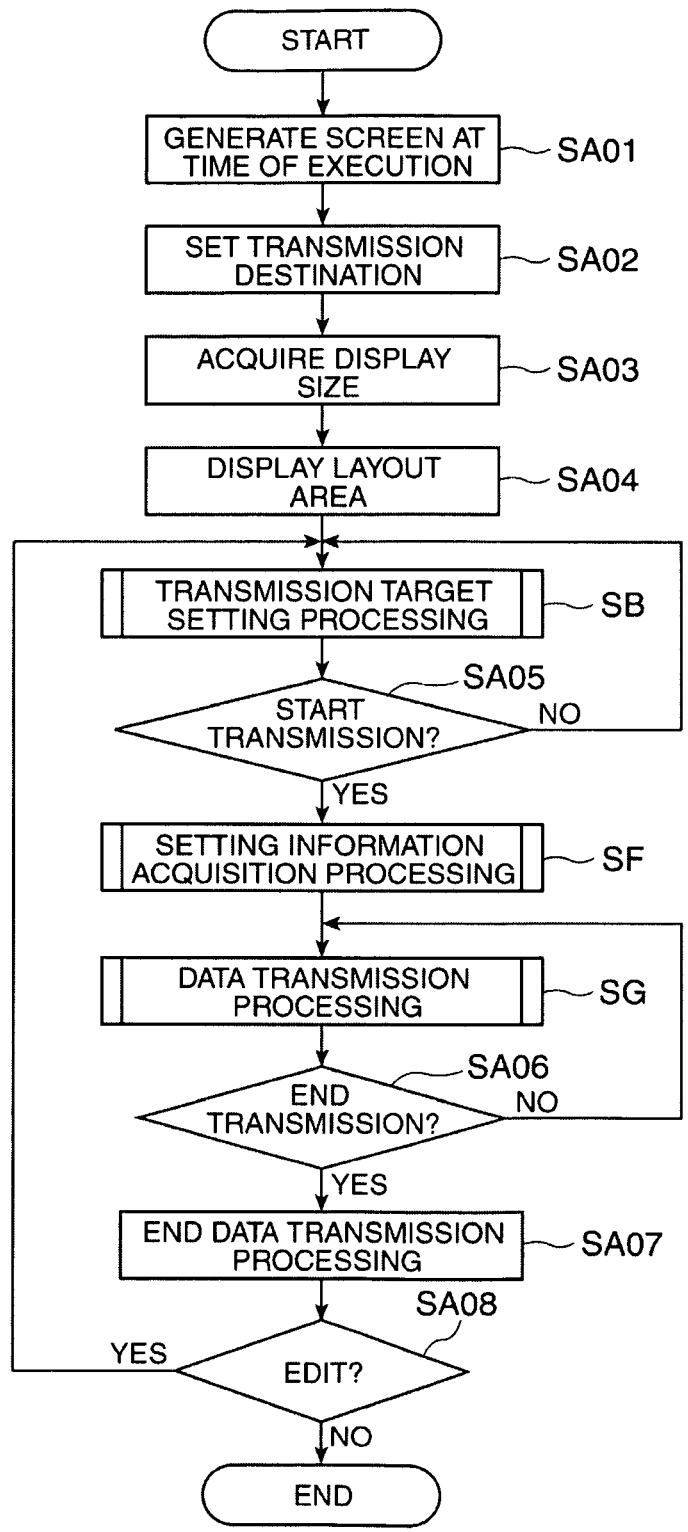
FIG. 15 is a flowchart showing processing at the time of executing an image transmission application in the embodiment.

FIG. 15 is a flowchart showing processing at the time of executing the image transmission application executed by the PC 3A.

If an operation to execute the image transmission application is carried out to the operation unit 31 by the user, the image transmission application executing unit 4A carries out the foregoing steps SA01 to SA04 and the transmission target setting processing SB, as shown in FIG. 15. After that, in step SA05, it is determined whether the "start transmission" key K7 is entered or not. If it is determined that the key K7 is not entered, the image transmission application executing unit 4A executes the transmission target setting processing SB again. If it is determined that the key K7 is entered, the image transmission application executing unit 4A carries out setting information acquisition processing SF.

Figure 16:
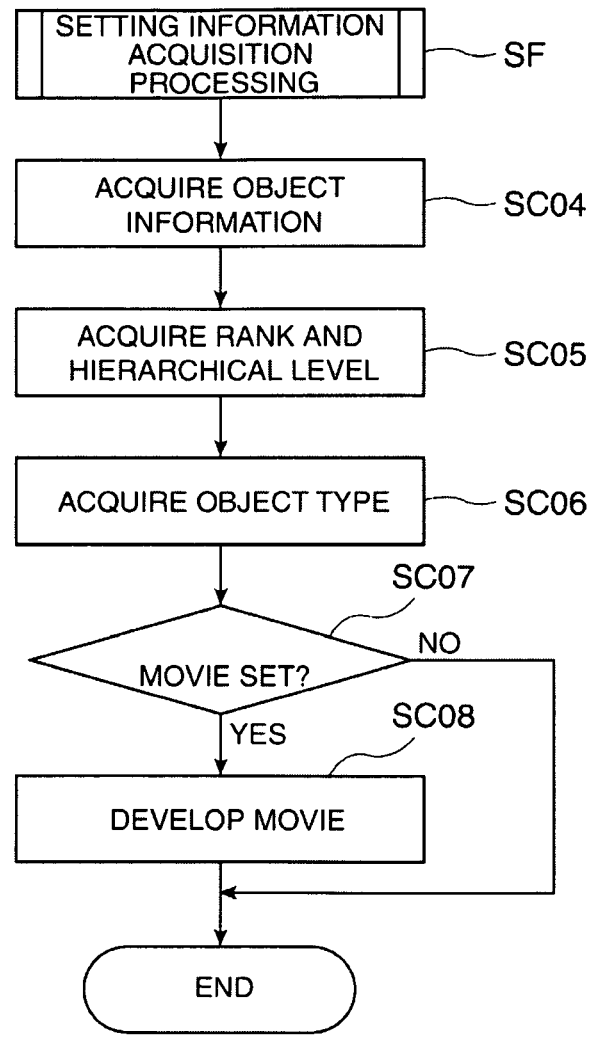
FIG. 16 is a flowchart showing setting information acquisition processing in the embodiment.

FIG. 16 is a flowchart showing the setting information acquisition processing SF.

In the setting information acquisition processing SF, the processing with respect to the background in the setting information acquisition processing SC is omitted and the processing similar to steps SC04 to SC08 is executed. That is, in the setting information acquisition processing SF, the area information acquiring unit 52 acquires the position, size, rank, hierarchical level and type of each object that is set in the image transmission list (steps SC04 to SC06), as shown in FIG. 16. Then, the movie developing unit 53 determines whether a movie file is set in the image transmission list or not (step SC07). If it is determined that a movie file is set, the corresponding movie file is developed in the drawing memory 35 (step SC08).

Then, the setting information acquisition processing SF ends.

Figure 17:
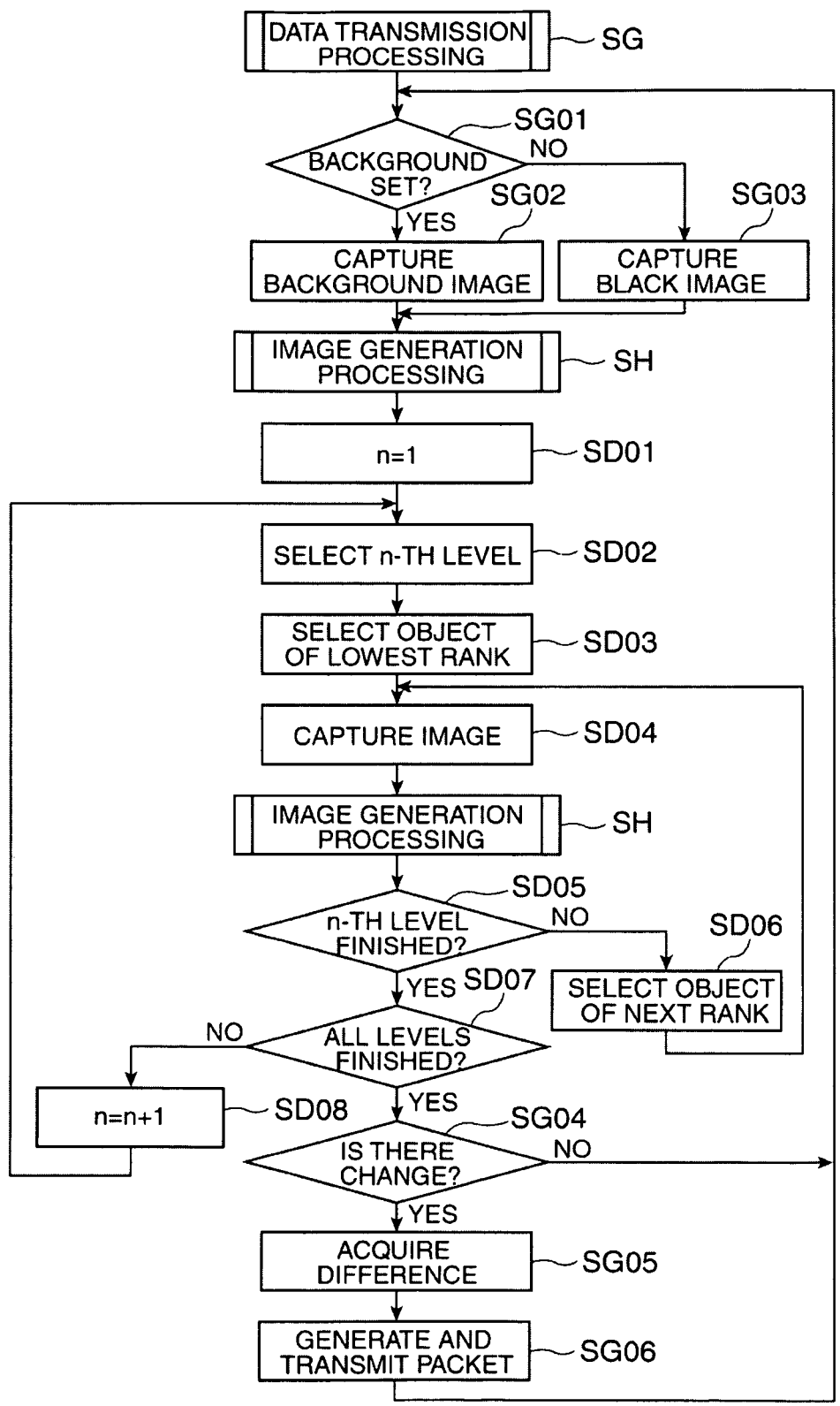
FIG. 17 is a flowchart showing data transmission processing in the embodiment.

FIG. 17 is a flowchart showing data transmission processing SG.

Referring again to FIG. 15, after the setting information acquisition processing SF, the image transmission application executing unit 4A executes the data transmission processing SG.

In the data transmission processing SG, first, the background setting determining unit 550 determines whether a still image file is selected as a background in the image transmission list or not (step SG01), as shown in FIG. 17. Here, if it is determined that a still image file is selected, the image capture unit 544 captures the image data of the corresponding image file from the drawing memory 35 and copies the image data to the frame memory 36 (step SG02).

Meanwhile, if it is determined that a still image file is not selected, the black image generating unit 551 generates black image data in the drawing memory 35, and the image capture unit 544 copies the black image data to the frame memory 36 (step SG03).

After these steps SG02 and SG03, the image transmission application executing unit 4A sets the copied background image data as target data and executes image generation processing SH to the target data.

Figure 18:
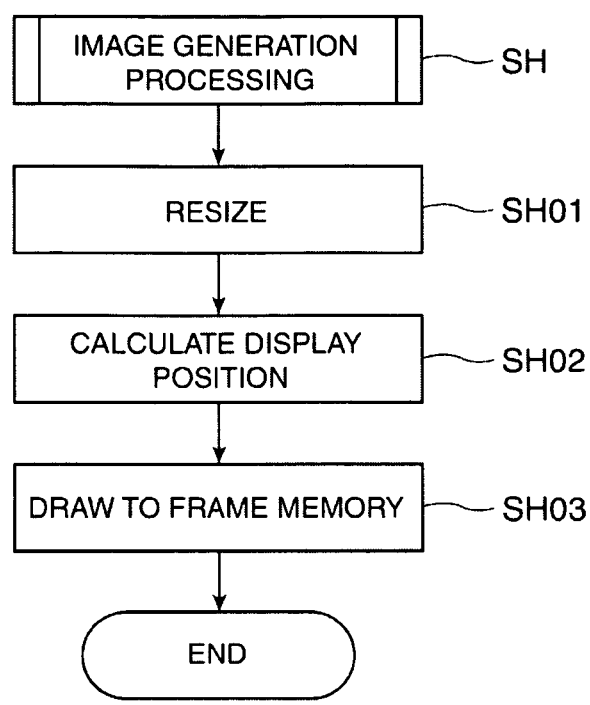
FIG. 18 is a flowchart showing image generation processing in the embodiment.

FIG. 18 is a flowchart showing the image generation processing SH.

The image generation processing SH is the processing to generate image data for one screen of a display image.

In the image generation processing SH, first, the image processing unit 5471 of the complete image generating unit 552 resizes the image data as target data (step SH01), as shown in FIG. 18.

Then, the display position calculating unit 5472 calculates the position of the resized image data in a display image on the basis of the position of the target data in the layout area RA (step SH02).

Next, the image generating unit 5521 draws the resized image data at the position calculated by the display position calculating unit 5472, in the image data of the display image drawn in the frame memory 36, and couples the resized image data to the image data of the display image that is being generated (step SH03).

As the image generation processing SH is carries out to the image data of the background and each object, image data for one screen of the display image (image data of one frame) is generated on the frame memory 36.

Then, the image generation processing SH ends.

Referring again to FIG. 17, after the image generation processing SH with respect to the background image data, the image transmission application executing unit 4A carries out processing similar to steps SD01 to SD08 in the data transmission processing SD. However, after SD04, the image generation processing SH is carried out with respect to the image data of a target object, instead of the packet transmission processing SE.

If it is determined by the target hierarchical level determining unit 549 that all the hierarchical levels are selected as target hierarchical levels in the determination processing in step SD07, the change determining unit 553 compares the newly generates image data for one screen of the display image with the already generated image data for one screen of the display image corresponding to the previous frame and thus determines whether there is a change between these image data (step SG04).

If it is determined that there is no change, the image transmission application executing unit 4A determines that the newly generated image data of the display image need not be transmitted, and returns the processing to SG01.

Meanwhile, if it is determined that there is a change, the difference acquiring unit 554 acquires differential image data with respect to the image data of the display image of the previous frame, from the newly generated image data of the display image (step SG05).

After that, the packet generating unit 555 divides the differential image data according to the need and generates a packet including the rectangular image data and header information indicating the position of the rectangular image data, and the data transmitting unit 55 transmits the packet to the transmission destination device (step SG06), as described above. After that, the image transmission application executing unit 4A returns the processing to step SG01. Thus, if there is a change, newly generated image data for one frame of a display image is transmitted to the transmission destination device.

Meanwhile, if it is determined that the key K8 is entered, the main control unit 41 ends data transmission processing SG and ends the transmission of the packet to the transmission destination device (step SA07).

Then, the operation determining unit 45 determines whether an editing operation is carried out on the screen at the time of executing the image transmission application or not (step SA08). If it is determined that the editing operation is carried out, the image transmission application executing unit 4A executes the transmission target setting processing SB again.

If it is determined by the operation determining unit 45 that the editing operation is not carried out and an operation to end the image transmission application is carried out, the image transmission application executing unit 4A ends the image transmission application.

The display system according to this embodiment as described above has effects similar to the effects (1) to (3) of the display system 1 and also has the following effects.

(6) The data generating unit 54A couples the image data of the objects in order from the object of the lowest hierarchical level, thus generates image data for one screen of a display image, and generates a packet as transmission data corresponding to the image data. Thus, a display image in which the front-back relation of the image of each object is collapsed can be prevented from being temporarily displayed. Therefore, a display image according to a preset layout can be displayed securely and properly.

(7) A packet transmitted to the transmission destination device includes the difference between newly generated image data for one screen of a display image and image data generated before the newly generated image data. That is, if there is a change between these image data, the image data of the packet is differential image data, and the display position of the image corresponding to the differential image data is indicated by header information. Thus, since image data for one screen having a large amount of data need not be sequentially transmitted, the amount of data transmitted to the transmission destination device can be reduced.

(8) If an image corresponding to differential image data acquired by the difference acquiring unit 554 is not rectangular, the packet generating unit 555 divides the image into plural rectangular images and generates a packet including rectangular image data of each of the divided rectangular images. Thus, when forming a display image at the transmission destination device, update image data can be coupled more easily to the image data of the display image that is currently displayed. Therefore, the burden of image display processing in the transmission destination device can be reduced and the display image can be properly displayed.

Third Embodiment

Now, a third embodiment of the invention will be described.

The display system according to this embodiment has a configuration similar to that of the display system described in the second embodiment. However, in the display system according to the second embodiment, when image data of a non-rectangular image is acquired as differential image data, the packet generating unit 555 divides the differential image data into plural rectangular areas and generates a packet including rectangular image data corresponding to the rectangular areas. In contrast, the display system according to this embodiment is different from the display system according to the second embodiment in that one rectangular area is formed by adding a transmissive area to a non-rectangular image corresponding to differential image data and a packet including the image data of the rectangular area is generated.

Figure 19:
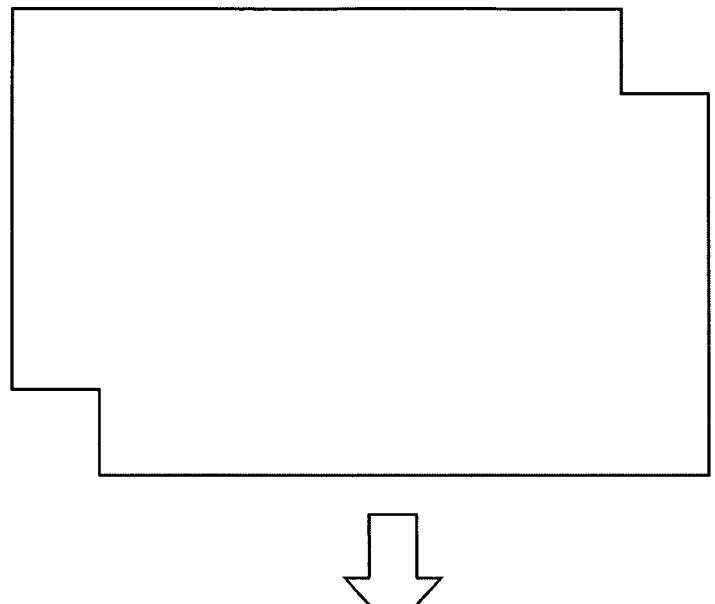
FIG. 19 shows an exemplary image data included in a packet generated by a PC of a display system according to a third embodiment of the invention.
Figure 19:
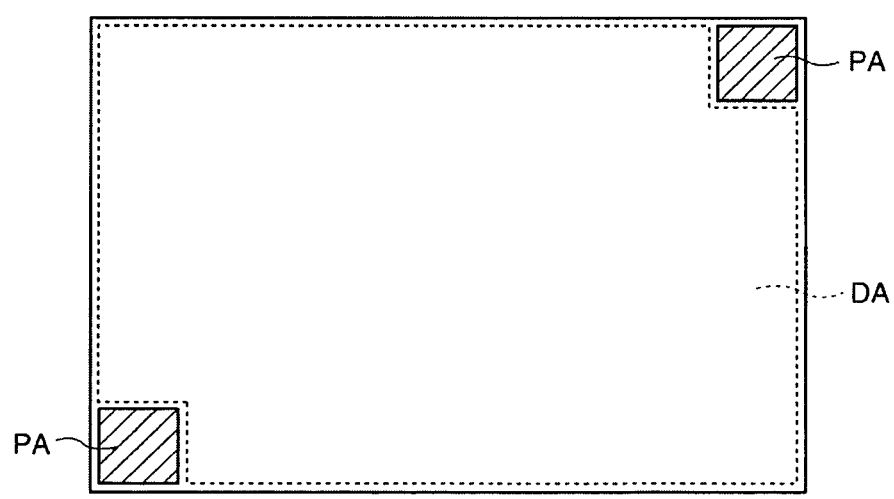

FIG. 19 is a schematic view showing image data generated by the packet generating unit of the PC which constitutes the display system according to this embodiment.

The display system according to this embodiment has the above-described projector 2 and PC 3A.

Of these, when differential image data of a non-rectangular image as shown at the top of FIG. 19 is acquired, the packet generating unit 555 of the PC 3A according to this embodiment combines the area DA of the image of the differential image data with transmissive areas PA to form a minimum rectangular area and generates rectangular image data corresponding to this rectangular area as shown at the bottom of FIG. 19. Then, the packet generating unit 555 generates a packet including the generated rectangular image data and header information indicating the display position of the rectangular area in a display image at the transmission destination device. The data transmitting unit 55 transmits the packet.

Meanwhile, in the projector 2 as the transmission destination device, when the packet including the transmissive areas PA in its image data is received, the packet analyzing unit 223 restores the image data from the packet and the image developing unit 224 couples the restored image data with image data of a display image formed in the image memory 225. In this case, the image developing unit 224 only couples the image data corresponding to the area DA without coupling the transmissive areas PA.

Thus, even if differential image data of a non-rectangular image is acquired at the PC 3A, the differential image data is properly coupled with an already formed display image and the display image is properly updated at the projector 2.

The display system according to this embodiment as described above has the following effects as well as the effects (1) to (3) that can be realized by the display system 1 and the effects (6) and (7) that can be realized by the display system according to the second embodiment.

(9) If an image corresponding to differential image data acquired by the difference acquiring unit 554 is not rectangular, the packet generating unit 555 adds transmissive areas PA that are displayed at the transmission destination device, thus generates a rectangular image, and generates a packet including rectangular image data. Accordingly, when forming a display image at the transmission destination device (projector 2), it is possible to easily couple image data for update with the image data of the currently displayed display image. Thus, the burden of image display processing in the transmission destination device can be reduced and the display image can be properly displayed. Moreover, since it suffices to generate one packet for one change area, the amount of data transmitted to the transmission destination device can be reduced.

Modifications of Embodiments

The invention is not limited to the above embodiments. Various modifications and improvements can be made and included in the invention without departing from the scope of the invention.

In the embodiments, a still image file selected as a background image, a still image file selected as a still image, a movie file selected as a movie, an application that is being executed, an inputted character string, and a graphic pattern are employed as exemplary objects included in a display image. However, the invention is not limited to these examples and other image data may be included. It is not necessary to select plural objects. The number of selected objects may be properly set.

In the embodiments, the PC 3 or 3A as an image transmission device and the projector as a display device are connected by a LAN. However, the invention is not limited to this configuration and these devices may be connected in other forms such as via USB or DVI (Digital Visual Interface). In such cases, the data generating unit 54 or 54A can generate transmission data according to the connection form.

In the embodiments, the data generating unit 54 or 54A generates, as transmission data, a packet including image data that is resized according to the image display size of the transmission destination device. However, the invention is not limited to this configuration. For example, the display device to serve as the transmission destination device may resize received image data according to the image display size of the display device, then calculate the display position of an image corresponding to the resized image data, in a display image, and display the display image.

In the embodiments, the image transmission program according to the image transmission application is stored in the storage unit 32 formed by HDD. However, the invention is not limited to this configuration. That is, the image transmission program may be recorded in a disk-like recording medium such as CD (Compact Disc) and DVD (Digital Versatile Disc) or may be recorded in a semiconductor memory. Then, according to the user's operation, the image transmission application recorded in these recording media can be read and executed.

In the embodiments, the projector 2 is described as an exemplary projector having a liquid crystal panel as a light modulation device. However, light modulation devices having other configurations may also be employed as long as these devices modulate incident luminous fluxes to image information and thus form an optical image. For example, a projector using a non-liquid crystal light modulation device such as a device using a micro-mirror may be employed.

In the embodiments, the display system 1 including the projector 2 as a display device and the PC 3 or 3A as an image transmission device is described as an example. However, the invention is not limited to this configuration. That is, the display device and the image transmission device may be other electronic devices. For example, various displays such as liquid crystal, organic EL (electroluminescence) and CRT (Cathode Ray Tube) displays can be employed as the display device. Moreover, as described above, a desktop PC having a computer body and a separate display device for displaying a screen at the time of operation may be employed as the image transmission device. It is also able to replace PC 3 or 3A with a kind of PDA (Personal Digital Assistant) or smartphone. Such devices can execute application program and can output video signal or data corresponding to video signal.

The invention can be preferably utilized for a display system including a display device and an image transmission device.

What is claimed is:

1. An image transmission device which transmits an image data of a display image to be displayed by a display device, comprising:
    a selecting unit which selects a plurality of objects constituting the display image;
    an image display unit which displays an operation image, the operation image comprising:
        a first operation area to select an object of the plurality of objects;
        a second operation area to control the transmission of the transmission data; and
        a layout area in which images corresponding to the plurality of objects, including the object selected by the first operation area, are arranged;
    an operation unit;
    a layout setting unit which sets a layout in the layout area of the images corresponding to the plurality of objects, the layout setting unit changing position and size of the image corresponding to the object selected by the first operation area in the layout area in accordance with an operation to the operation unit;
    a data generating unit which generates transmission data to serve as the image data of the display image; and
    a data transmitting unit which transmits the generated transmission data to the display device,
    wherein the data generating unit:
        determines that one or more objects of the plurality of objects are dynamic objects and one or more other objects of the plurality of objects are still objects,
        generates a first set of transmission data that includes a first set of image data corresponding to both the still objects and the dynamic objects, the first set of image data specifying a layout of images corresponding to each of the still objects and the dynamic objects in the display image based on the layout set by the layout setting unit,
        evaluates only the dynamic objects for changes following the generation of the first set of transmission data, and
        generates a second set of transmission data that includes a second set of image data corresponding to at least one of the dynamic objects that has changed following the generation of the first set of transmission data and not corresponding to the still objects.

2. The image transmission device according to claim 1, wherein
    the layout setting unit sets a layout in the layout area of the operation image, of the image of the object selected by the first operation area, and
    the data generating unit generates the transmission data based on the layout set by the layout setting unit.

3. The image transmission device according to claim 2, further comprising:
    a display size acquiring unit which acquires a displayable size of an image that can be displayed by the display device;

a layout area forming unit which forms the layout area corresponding to the acquired displayable size; and
an image arrangement unit which arranges an image corresponding to the object selected by the first operation area, in the layout area;
wherein the layout setting unit sets the layout of the object corresponding to the image in accordance with the image set in the layout area.

4. The image transmission device according to claim 1, further comprising a hierarchical level setting unit which sets a hierarchical level indicating a position from a backmost side of the object,
wherein the data generating unit generates the transmission data in order from the object for which the hierarchical level set by the hierarchical level setting unit is low.

5. The image transmission device according to claim 1, wherein the data generating unit generates image data for one screen of the display image and generates the transmission data based on the image data for the one screen, the one screen corresponding to one selected object of the plurality of selected objects.

6. The image transmission device according to claim 5, wherein the data generating unit comprises:
a change determining unit which determines whether the image data for the one screen that is newly generated is changed from the image data for the one screen that is generated before the newly generated image data;
a difference acquiring unit which acquires differential image data as a difference from the image data for the one screen that is generated before, from the newly generated image data for the one screen if it is determined by the change determining unit that there is a change; and
a transmission data generating unit which generates the transmission data based on the differential image data.

7. The image transmission device according to claim 6, wherein if an image formed by the differential image data is not rectangular, the transmission data generating unit divides the differential image data to generate plural rectangular image data so that images to be formed based on the rectangular image data are each rectangular, and generates each of the transmission data based on each of the rectangular image data, wherein at least two of the rectangular images to be formed based on the rectangular image data differ from each other in both length and width.

8. The image transmission device according to claim 6, wherein if an image formed by the differential image data is not rectangular, the transmission data generating unit adds an area that is not displayed by the display device, thus generates rectangular image data so that an image to be formed is rectangular, and generates the transmission data based on the rectangular image data.

9. A display system comprising the image transmission device according to claim 1, and a display device which displays a display image based on image data transmitted from the image transmission device.

10. The image transmission device according to claim 1, wherein:
a portion of the plurality of selected objects includes objects that did not visually change following the generation of the first set of transmission data and prior to generation of the second set of transmission data.

11. The image transmission device according to claim 1, wherein the data generating unit does not evaluate the still objects for changes following the generation of the first set of transmission data.

12. The image transmission device according to claim 1, further comprising a hierarchical level setting unit which sets hierarchical levels indicating positions from a backmost side of the plurality of objects,
wherein the data generating unit generates the second set of transmission data in order from a dynamic object for which the hierarchical level is lowest out of the dynamic objects that have changed following the generation of the first set of transmission data, such that:
the second set of image data corresponds to all objects having a higher hierarchical level than the dynamic object for which the hierarchical level is lowest out of the dynamic objects that have changed following the generation of the first set of transmission data, and
the second set of image data does not correspond to objects having a lower hierarchical level than the dynamic object for which the hierarchical level is lowest out of the dynamic objects that have changed following the generation of the first set of transmission data.

13. An image transmission program executed by an image transmission device which transmits an image data of a display image to be displayed by a display device, the image transmission program being embodied as computer-executable instructions on at least one non-transitory computer-readable storage medium, the image transmission program comprising:
selecting a plurality of objects to be included in the display image;
displaying an operation image on an image display unit, the operation image comprising:
a first operation area to select an object of the plurality of objects;
a second operation area to control the transmission of the transmission data; and
a layout area in which images corresponding to the plurality of objects, including the object selected by the first operation area, are arranged;
setting a layout in the layout area of the images corresponding to the plurality of objects;
changing position and size of the image corresponding to the object selected by the first operation area in the layout area in accordance with an operation to an operation unit;
generating transmission data as the image data of the display image; and
transmitting the generated transmission data to the display device,
wherein the generating the transmission data includes:
determining that one or more objects of the plurality of objects are dynamic objects and one or more other objects of the plurality of objects are still objects,
generating a first set of transmission data that includes a first set of image data corresponding to both the still objects and the dynamic objects, the first set of image data specifying a layout of images corresponding to each of the still objects and the dynamic objects in the display image based on the layout set by the layout setting unit,
evaluating only the dynamic objects for changes following the generation of the first set of transmission data, and
generating a second set of transmission data that includes a second set of image data corresponding to at least one of the dynamic objects that has changed following the generation of the first set of transmission data and not corresponding to the still objects.

14. A non-transitory recording medium in which the image transmission program according to claim 13 is recorded in a computer-readable manner.

15. An image transmission method for an image transmission device which transmits an image data of a display image to be displayed by a display device, the method comprising:
 selecting a plurality of objects to be included in the display image;
 displaying an operation image on an image display unit, the operation image comprising:
  a first operation area to select an object of the plurality of objects;
  a second operation area to control the transmission of the transmission data; and
  a layout area in which images corresponding to the plurality of objects, including the object selected by the first operation area, are arranged;
 setting a layout in the layout area of the images corresponding to the plurality of objects;
 changing position and size of the image corresponding to the object selected by the first operation area in the layout area in accordance with an operation to an operation unit;
 generating transmission data as the image data of the display image; and
 transmitting the generated transmission data to the display device,
 wherein the generating transmission data includes:
  determining that one or more objects of the plurality of objects are dynamic objects and one or more other objects of the plurality of objects are still objects,
  generating a first set of transmission data that includes a first set of image data corresponding to both the still objects and the dynamic objects, the first set of image data specifying a layout of images corresponding to each of the still objects and the dynamic objects in the display image based on the layout set by the layout setting unit,
  evaluating only the dynamic objects for changes following the generation of the first set of transmission data, and
  generating a second set of transmission data that includes a second set of image data corresponding to at least one of the dynamic objects that has changed following the generation of the first set of transmission data and not corresponding to the still objects.

16. The method according to claim 15, further comprising:
 setting a layout of the image of the object in the layout area of the operation image, wherein the generating transmission data generates the image data of the display image based on the layout.

17. The method according to claim 16, further comprising:
 acquiring a displayable size of an image that can be displayed by the display device;
 forming the layout area corresponding to the acquired displayable size; and
 arranging an image corresponding to the object in the layout area;
 wherein the setting layout sets the layout of the object corresponding to the image in accordance with the image set in the layout area.

18. The method according to claim 15, further comprising:
 setting a hierarchical level indicating a position from a backmost side of the object,
 wherein the generating transmission data generates the transmission data in order from the object for which the hierarchical level is low.

19. The method according to claim 15, wherein the generating transmission data generates image data for one screen of the display image and generates the transmission data based on the image data for the one screen, the one screen corresponding to one selected object of the plurality of selected objects.

* * * * *